United States Patent
Ishimaru et al.

(10) Patent No.: US 12,135,807 B2
(45) Date of Patent: Nov. 5, 2024

(54) INFORMATION PROCESSING SYSTEM, INFORMATION PROCESSING METHOD, TERMINAL APPARATUS, AND INFORMATION PROCESSING APPARATUS

(71) Applicant: SONY CORPORATION, Tokyo (JP)

(72) Inventors: Mikio Ishimaru, Tokyo (JP); Kenta Endo, Tokyo (JP)

(73) Assignee: Sony Corporation, Tokyo (JP)

( * ) Notice: Subject to any disclaimer, the term of this patent is extended or adjusted under 35 U.S.C. 154(b) by 409 days.

(21) Appl. No.: 17/268,039

(22) PCT Filed: Aug. 9, 2019

(86) PCT No.: PCT/JP2019/031661
§ 371 (c)(1),
(2) Date: Feb. 11, 2021

(87) PCT Pub. No.: WO2020/049958
PCT Pub. Date: Mar. 12, 2020

(65) Prior Publication Data
US 2021/0319144 A1     Oct. 14, 2021

(30) Foreign Application Priority Data
Sep. 6, 2018 (JP) .................................. 2018-167374

(51) Int. Cl.
*G06F 21/62* (2013.01)
*G06F 21/84* (2013.01)
(Continued)

(52) U.S. Cl.
CPC ...... *G06F 21/6209* (2013.01); *G06F 21/6245* (2013.01); *G06F 21/84* (2013.01);
(Continued)

(58) Field of Classification Search
None
See application file for complete search history.

(56) References Cited

U.S. PATENT DOCUMENTS

2008/0193018 A1*   8/2008   Masuda ............... H04N 23/611
                                                         382/190
2009/0010570 A1    1/2009   Yamada et al.
(Continued)

FOREIGN PATENT DOCUMENTS

| JP | 2001222719 A | 8/2001 |
| JP | 2006-319775 | 11/2006 |

(Continued)

OTHER PUBLICATIONS

L. Yuan, P. Korshunov and T. Ebrahimi, "Privacy-preserving photo sharing based on a secure JPEG," 2015 IEEE Conference on Computer Communications Workshops (INFOCOM WKSHPS), Hong Kong, China, 2015, pp. 185-190, doi: 10.1109/INFCOMW.2015.7179382 (Year: 2015).*

(Continued)

*Primary Examiner* — Piotr Poltorak
*Assistant Examiner* — Felicia Farrow
(74) *Attorney, Agent, or Firm* — Sheridan Ross PC

(57) ABSTRACT

A terminal apparatus according to an embodiment includes a solid-state imaging element and a first communication unit. The solid-state imaging element includes an image sensor, an image processing unit, and an output interface. The image sensor converts received light into an image. The image processing unit detects a specific object in the image. The output interface outputs the image. The first communication unit transmits the image output from the output interface. The information processing apparatus includes a second communication unit and a processor. The processor receives an image transmitted from the terminal apparatus with the second communication unit. When the image (Continued)

received with the second communication unit is an image in which the image processing unit has detected a specific object, the processor performs mask processing of masking the specific object.

16 Claims, 14 Drawing Sheets

(51) Int. Cl.
  *G06T 7/70* (2017.01)
  *G06V 40/16* (2022.01)
  *H04N 5/913* (2006.01)
  *H04N 23/80* (2023.01)

(52) U.S. Cl.
  CPC ............... *G06T 7/70* (2017.01); *H04N 5/913* (2013.01); *H04N 23/80* (2023.01); *G06V 40/161* (2022.01); *H04N 2005/91357* (2013.01)

(56) References Cited

U.S. PATENT DOCUMENTS

| | | | | |
|---|---|---|---|---|
| 2014/0168477 A1* | 6/2014 | David | ............... | G06Q 30/0621 348/441 |
| 2016/0255091 A1* | 9/2016 | Evans | .................... | G06Q 50/01 726/4 |
| 2017/0372046 A1 | 12/2017 | Thomee | | |
| 2018/0189461 A1 | 7/2018 | Ghafourifar et al. | | |
| 2019/0073813 A1 | 3/2019 | Ito | | |
| 2019/0306334 A1* | 10/2019 | Katoh | ................ | H04N 1/00209 |

FOREIGN PATENT DOCUMENTS

| | | |
|---|---|---|
| JP | 2009-033738 | 2/2009 |
| JP | 2015-184909 | 10/2015 |
| JP | 2016167170 A | 9/2016 |
| JP | 2017103748 A | 6/2017 |
| JP | 2017-184120 | 10/2017 |
| JP | 2018122357 | 6/2018 |
| JP | 2019-050553 | 3/2019 |
| WO | WO-2018060863 A1 | 4/2018 |

OTHER PUBLICATIONS

International Search Report prepared by the Japan Patent Office on Oct. 25, 2019, for International Application No. PCT/JP2019/031661.

* cited by examiner

INFORMATION PROCESSING SYSTEM, INFORMATION PROCESSING METHOD, TERMINAL APPARATUS, AND INFORMATION PROCESSING APPARATUS

This application is a national stage application under 35 U.S.C. 371 and claims the benefit of PCT Application No. PCT/JP2019/031661 having an international filing date of 9 Aug. 2019, which designated the United States, which PCT application claimed the benefit of Japanese Patent Application No. 2018-167374 filed 6 Sep. 2018, the entire disclosures of each of which are incorporated herein by reference.

Field

The present disclosure relates to an information processing system, an information processing method, a terminal apparatus, and an information processing apparatus.

BACKGROUND

With the development of the Internet, services such as a social networking service (SNS) have been widespread. Only a user who registers an account and uses specific application software can use such a service. Furthermore, users have had the growing number of opportunities to publish captured images captured by the users themselves to such services. Commonly, in a service such as an SNS, access is closed in the service, so that, even if a captured image published in the service contains personal information such as a face, it is possible to prevent the fact from developing into a serious problem.

In contrast, when a captured image published on the SNS is taken out of the SNS, the captured image may be leaked to the Internet. It is extremely difficult to collect information that has once leaked on the Internet. Thus, a person who publishes a captured image or the SNS side is required to preliminarily take some measures for protecting privacy. As one example of such measures, there are known techniques for protecting privacy by performing, in the case where a face is detected from a captured image, some treatment, such as mask processing for making face identification difficult, on a region of a detected face (e.g., Patent Literature 1). Privacy can be protected by performing such treatment on a published captured image even when the captured image is taken out of the SNS.

CITATION LIST

Patent Literature

Patent Literature 1: JP 2009-194687 A

SUMMARY

Technical Problem

Unfortunately, in a conventional privacy protection measure for a captured image, a captured image is directly treated, so that an untreated original captured image cannot be viewed even in an SNS.

An object of the disclosure is to provide an information processing system, an information processing method, a terminal apparatus, and an information processing apparatus capable of making viewing of an original image before treatment and viewing of the image after the treatment compatible.

Solution to Problem

For solving the problem described above, an information processing system according to one aspect of the present disclosure has a terminal apparatus; and an information processing apparatus, the terminal apparatus including: a solid-state imaging element; and a first communication unit, the solid-state imaging element including: an image sensor that converts received light into an image; an image processing unit that detects a specific object in the image; and an output interface that outputs the image, the first communication unit transmitting an image output from the output interface, the information processing apparatus including a second communication unit; and a processor, wherein the processor: receives an image transmitted from the terminal apparatus with the second communication unit; and when the image received with the second communication unit is the image in which the image processing unit has detected the specific object, performs mask processing of masking the specific object.

DESCRIPTION OF EMBODIMENTS

Embodiments of the disclosure will be described in detail below with reference to the drawings. Note that, in the following embodiments, the same signs are attached to the same parts, thereby omitting duplicate description.

Outline of System Applicable to Each Embodiment

Figure 1:
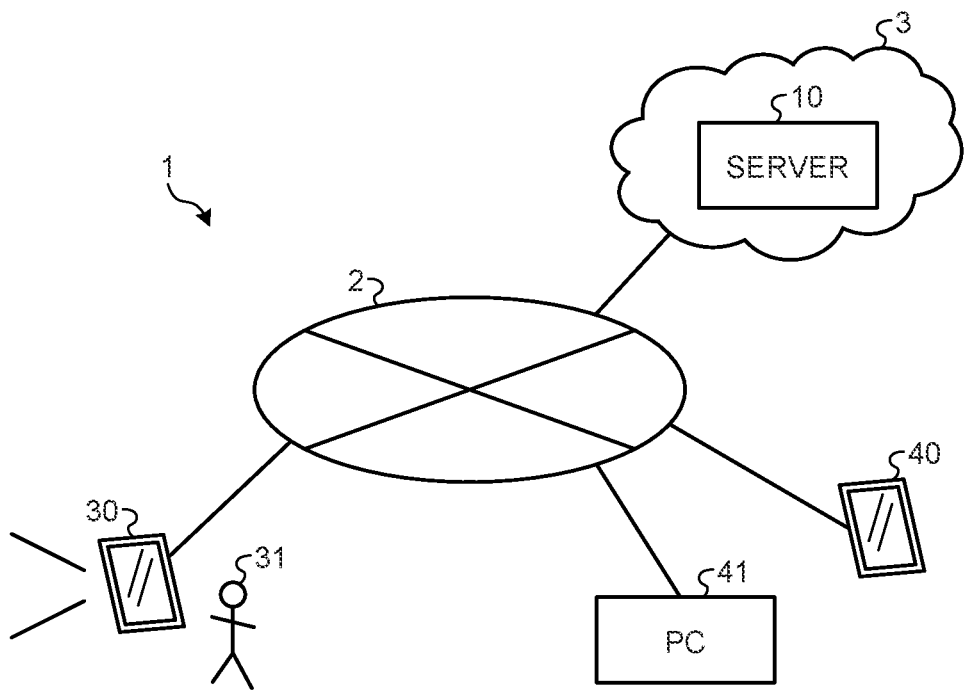
FIG. 1 schematically illustrates one example of the configuration of an information processing system applicable to each embodiment.

FIG. 1 schematically illustrates one example of the configuration of an information processing system applicable to each embodiment. In FIG. 1, an information processing system 1 includes a server 10 and a terminal apparatus 30 as a hardware configuration. The server 10 and the terminal apparatus 30 are connected by a network 2, which is, for example, the Internet.

The server 10 is dispersively configured by, for example, a plurality of information processing apparatuses and storage apparatuses on a cloud network 3. Not limited to this, the server 10 may be configured by, for example, one information processing apparatus including a storage apparatus. The terminal apparatus 30 is a mobile terminal such as a smartphone and a tablet computer, and has an imaging function. A user 31 can transmit a captured image captured by using the imaging function of the terminal apparatus 30 to the network 2.

The information processing system 1 may further include terminal apparatuses 40 and 41 that can be connected to the network 2. In this example, the terminal apparatus 40 and the terminal apparatus 41 are illustrated as a mobile terminal and a desktop personal computer (PC), respectively.

In the information processing system 1, the server 10 provides a closed service, for example, a social networking service (SNS) to a person who has registered an account. The terminal apparatuses 30, 40, and 41 are mounted with specific application software. An account is registered to the server 10 by using the application software, whereby the service is made usable. The application software is mounted and used on each of the terminal apparatuses 30, 40, and 41.

Not limited to this, the application software may be operated on the server 10. In this case, the service is made usable by accessing the server 10 from a browser application mounted on each of the terminal apparatuses 30, 40, and 41. In the following description, the application software is assumed to be mounted on the terminal apparatuses 30 and 40. Furthermore, in the following description, a service provided by the server 10 is assumed to be an SNS, and application software for using the service is referred to as an SNS app.

The user 31 of the terminal apparatus 30 sets account information by using the SNS app mounted on the terminal apparatus 30. The account information contains identification information (e.g., username and password) for identifying the user 31. The user 31 registers an account by transmitting the set account information to the server 10. The server 10 authenticates the user 31 based on the account information transmitted from the terminal apparatus 30. When the authentication is successful, the server 10 permits the user 31 to log in to the SNS.

The user 31 can transmit, for example, a captured image captured by using the imaging function of the terminal apparatus 30 to the server 10 via the network 2 by logging in to the SNS by using the SNS app in the terminal apparatus 30. The server 10 can store the captured image transmitted from the terminal apparatus 30, and publish the captured image through the SNS.

Similarly, in the terminal apparatus 40, a user (not illustrated) of the terminal apparatus 40 registers account information to the server 10 by using the SNS app.

First Embodiment

Outline of Processing According to First Embodiment

Figure 2:
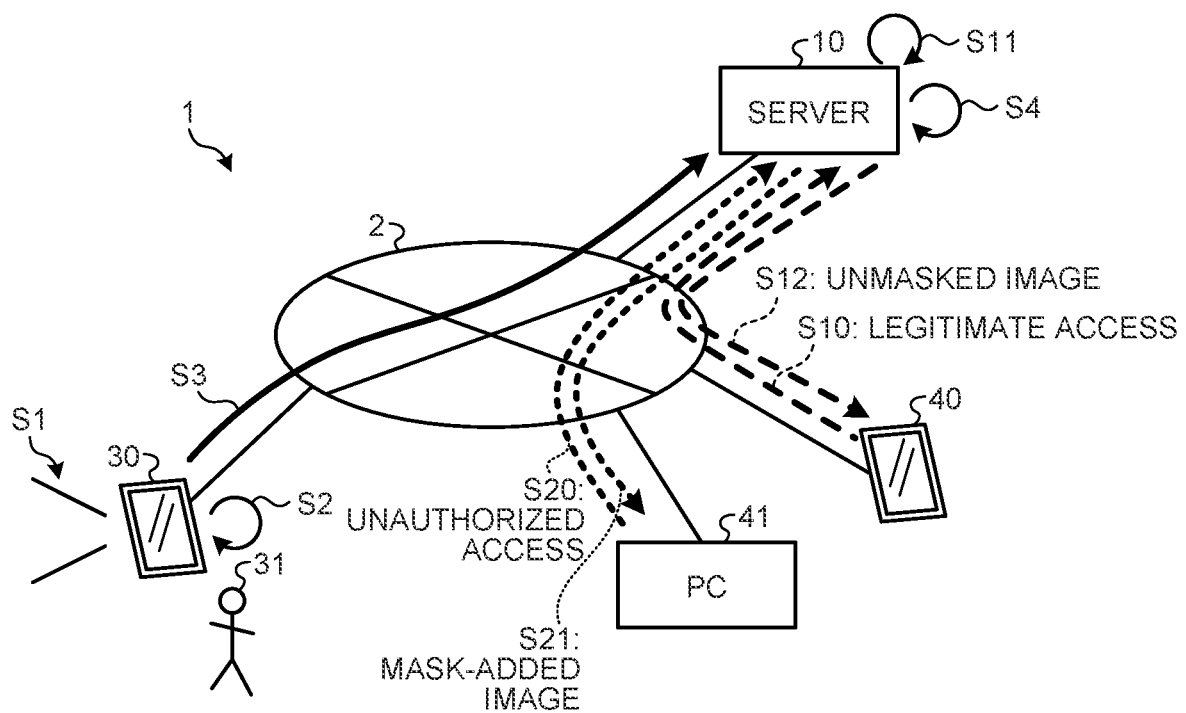
FIG. 2 schematically illustrates the flow of processing performed by an information processing system according to a first embodiment.

Next, an information processing system according to a first embodiment will be described. FIG. 2 schematically illustrates the flow of processing performed by the information processing system 1 according to the first embodiment. The user 31 accesses the server 10 by using the SNS app on the terminal apparatus 30, and logs in to the SNS. After logging in to the SNS, the user 31 images a subject by using the imaging function of the terminal apparatus 30 (Step S1). In the terminal apparatus 30, the SNS app analyzes the captured image that has been captured, and detects a specific object contained in the captured image (Step S2).

Here, the specific object to be detected by the terminal apparatus 30 refers to an image indicating personal information itself or an image that may contain personal information among images contained in the captured image. More specifically, an image of a face indicates personal information itself. Furthermore, an image of a license plate of a vehicle is also considered to be an image indicating personal information itself. Furthermore, an image of an open window of a building may contain personal information. In the terminal apparatus 30, when a specific object is detected from the captured image, the SNS app adds identification information (referred to as a detection flag) indicating the fact to the captured image.

The terminal apparatus 30 transmits the captured image to the server 10 via the network 2 by using the SNS app (Step S3). When the detection flag indicating that a specific object has been detected is added to the captured image received from the terminal apparatus 30, the server 10 analyzes the captured image, and detects the specific object contained in the captured image. Then, the server 10 performs reversible mask processing on the detected specific object (Step S4). The mask processing causes an original image of a part of the specific object in the captured image to be beyond recognition. The server 10 stores the captured image that has been subject to the mask processing (referred to as a mask processing image) in a storage apparatus such as a hard disk drive, and registers the captured image in the SNS.

Processing at the time of acquiring a mask processing image registered in the SNS in the server 10 will be described. First, an example, in which a user having an account registered in the SNS acquires a mask processing image registered in the SNS by using the terminal apparatus 40 mounted with the SNS app, will be described. The user accesses the server 10 by using the SNS app in the terminal apparatus 40 to log in to the SNS, and requests the mask processing image from the server 10 (Step S10). The request for the mask processing image performed by the terminal apparatus 40 is made by a legitimate access performed by logging in to the SNS.

Note that, as for the request for the mask processing image, the behavior of the user logging in to the SNS from the terminal apparatus 30 may be regarded as the request for the mask processing image, and page switching on a display screen performed by the SNS app during operation of the SNS app may be regarded as the request for the mask processing image. Furthermore, scrolling a page on a display screen performed by the SNS app and enlarging or reducing the display on the display image during operation of the SNS app may be regarded as the request for the mask processing image.

Note that the user is not required to recognize whether or not the mask processing has been performed on the image displayed on the display screen of the SNS app. The request for the mask processing image here includes processing of the user operating the SNS app without being aware of the existence of image information.

The server 10 performs canceling processing of canceling a mask provided on the mask processing image in accordance with the request for the mask processing image caused by the legitimate access (Step S11). This operation enables the terminal apparatus 40 to acquire an image in which the mask of the mask processing image has been canceled (referred to as an unmasked image) by using the SNS app (Step S12).

Next, an example, in which a mask processing image registered in an SNS is acquired without accessing the SNS from, for example, the terminal apparatus 41, will be described. The terminal apparatus 41 accesses the server 10 based on the address of a mask processing image acquired by some method, and requests the mask processing image without logging in to the SNS (Step S20). The request for the mask processing image performed by the terminal apparatus 41 is made by an unauthorized access performed without logging in to the SNS.

The server 10 performs no processing related to a mask in response to the request for a mask processing image through the unauthorized access. Consequently, the terminal apparatus 41 acquires a mask processing image that remains subject to the mask processing, so that an original image at the position where the mask processing has been performed cannot be recognized.

As described above, in the first embodiment, the server 10 cancels the mask processing on a mask processing image and provides an unmasked image in response to a request through a legitimate access performed by logging in to the SNS for the mask processing image registered in the SNS. In contrast, the server 10 does not cancel the mask processing on the mask processing image in response to a request through an unauthorized access performed without logging in to the SNS.

Consequently, in the information processing system 1 according to the first embodiment, viewing an image on which mask processing has been canceled and viewing an image on which mask processing is performed are compatible in relation to an image containing a specific object registered in the SNS. In the case, the information processing system 1 cancels treatment, that is, the mask processing on an image requested by a user under the control of the SNS, and keeps the mask processing on an image requested by a user outside the control of the SNS. Thus, it is possible to inhibit an unmasked image on which the mask processing is canceled from being scattered on, for example, the Internet from mask processing images registered in the SNS.

Detailed Configuration of Information Processing System According to First Embodiment Next, more detailed configuration of the information processing system 1 according to the first embodiment will be described.

Figure 3:
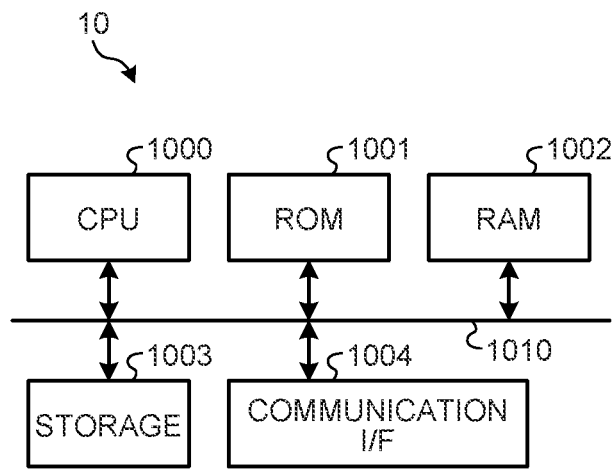
FIG. 3 is a block diagram illustrating an example of the hardware configuration of a server applicable to the first embodiment.

FIG. 3 is a block diagram illustrating an example of the hardware configuration of the server 10 applicable to the first embodiment. Note that, here, description will be given assuming that the server 10 includes one information processing apparatus. In FIG. 3, the server 10 includes a central processing unit (CPU) 1000, a read only memory (ROM) 1001, a random access memory (RAM) 1002, a storage 1003, and a communication I/F 1004, each of which is connected to a bus 1010.

The storage 1003 is a non-volatile large-capacity storage medium such as a hard disk drive and a flash memory. The storage 1003 may be built in the hardware of the server 10, or may be an external storage apparatus for the server 10.

The CPU 1000 uses the RAM 1002 as a work memory to control the overall operation of the server 10 in accordance with a program stored in the ROM 1001 and the storage 1003. The program contains a program for providing the above-described SNS. The communication I/F 1004 controls the communication to the network 2 in accordance with an instruction of the CPU 1000.

Figure 4:
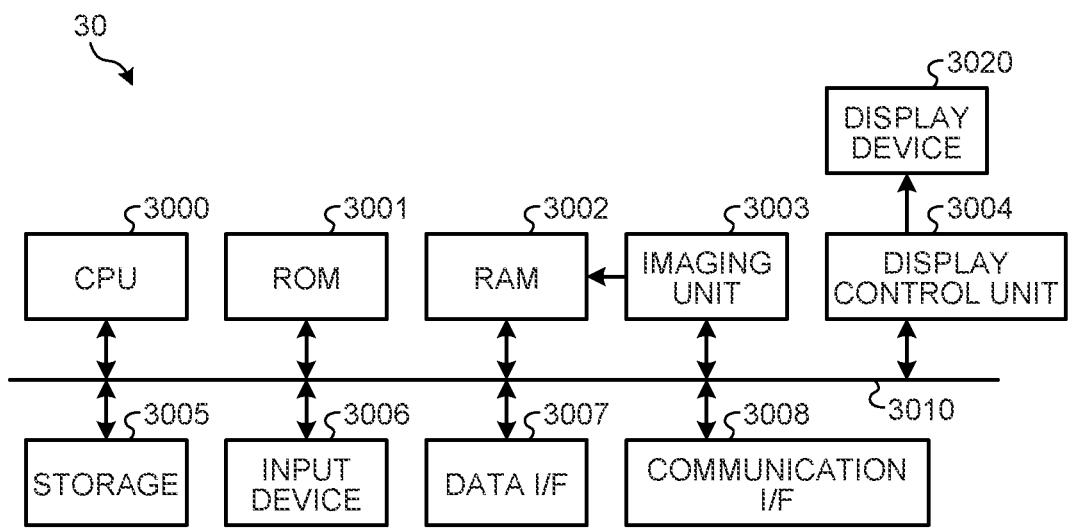
FIG. 4 is a block diagram illustrating an example of the hardware configuration of a terminal apparatus applicable to the first embodiment.

FIG. 4 is a block diagram illustrating an example of the hardware configuration of the terminal apparatus 30 applicable to the first embodiment. In FIG. 4, the terminal apparatus 30 includes a CPU 3000, a ROM 3001, a RAM 3002, an imaging unit 3003, a display control unit 3004, a storage 3005, an input device 3006, a data I/F 3007, and a communication I/F 3008, each of which is connected to a bus 3010.

The storage 3005 is a non-volatile large-capacity storage medium such as a hard disk drive and a flash memory. The CPU 3000 uses the RAM 3002 as a work memory to control the overall operation of the terminal apparatus 30 in accordance with a program stored in the ROM 3001 and the storage 3005. The program contains the above-described SNS app.

The imaging unit 3003 includes an imaging element, an optical system (e.g., lens), and a configuration. The optical system applies light from a subject to the imaging element. The configuration controls the imaging element, and processes a signal output from the imaging element. The imaging unit 3003 captures a still image or a moving image under the control of the CPU 3000. A captured image captured by the imaging unit 3003 is stored in the RAM 3002. Note that, in the following, unless otherwise specified, the captured image captured by the imaging unit 3003 is a still image.

The display control unit 3004 generates a display signal that can be displayed by a display device 3020 based on a display control signal generated by the CPU 3000. The display device 3020 includes, for example, a liquid crystal display (LCD) and a drive circuit for driving the LCD. A pointing device for outputting coordinate information in accordance with a position touched by, for example, a finger can be applied to the input device 3006. A so-called touch panel, which is integrally formed of the input device 3006 and the display device 3020, is preferred.

The data I/F 3007 is an interface for passing data with an external apparatus. For example, a universal serial bus (USB) and Bluetooth (registered trademark) can be applied to the data I/F 3007. The communication I/F 3008 controls the communication to a network 20 in accordance with an instruction from the CPU 3000.

Figure 5:
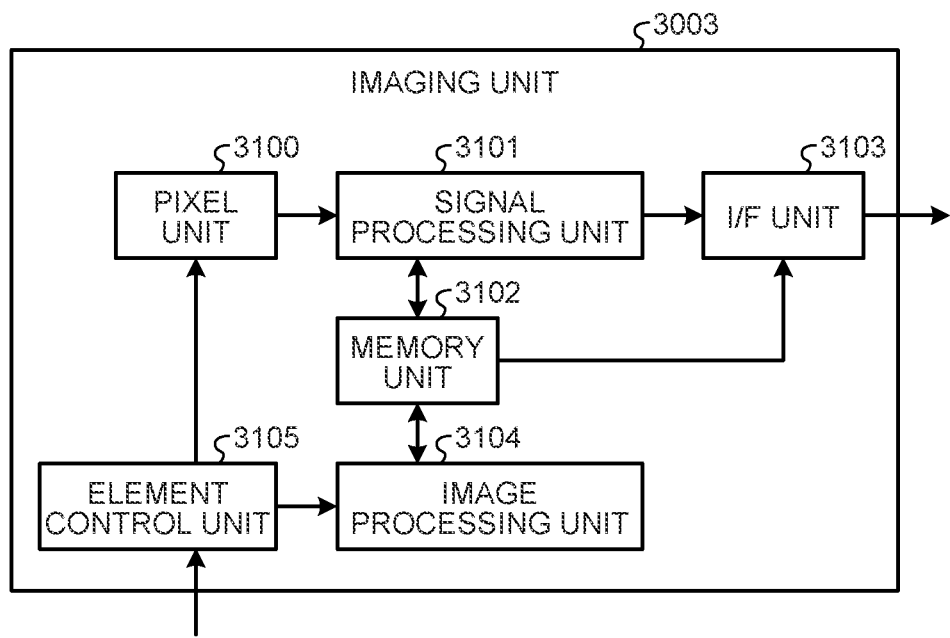
FIG. 5 is a block diagram illustrating an example of the hardware configuration of an imaging unit applicable to the first embodiment.

FIG. 5 is a block diagram illustrating an example of the hardware configuration of the imaging unit 3003 applicable to the first embodiment. Note that, in FIG. 5, the optical system is omitted. The imaging unit 3003 includes a pixel unit 3100, a signal processing unit 3101, a memory unit 3102, an I/F unit 3103, an image processing unit 3104, and an element control unit 3105. The imaging unit 3003 is a complementary metal oxide semiconductor (CMOS) image sensor (CIS) in which these units are integrally formed by using the CMOS.

The pixel unit 3100 is provided with a plurality of scanning lines and a plurality of signal lines. A pixel circuit is disposed at the intersection of each scanning line and each signal line. A plurality of pixel circuits is provided in a two-dimensional grid pattern. The pixel circuit uses, for example, a photodiode as a photoelectric conversion element. A microlens and a color filter are formed on the photodiode. Furthermore, the pixel unit 3100 includes a row scanning circuit, an analog to digital (AD) converter for each row, and a column scanning circuit. In the pixel unit 3100, the row scanning circuit scans each pixel circuit for each row, and the AD converter converts an analog-type pixel signal output for each row into digital-type pixel data. The column scanning circuit sequentially transfers the pixel data converted from A to D for each row to the signal processing unit 3101.

The signal processing unit 3101 performs signal processing on the pixel data that has been transferred from the pixel unit 3100. The signal processing includes correlated double sampling (CDS) processing, auto gain control (AGC) processing, and white balance (WB) processing. The image data on which the signal processing has been performed by the signal processing unit 3101 is transferred to the memory unit 3102 and the I/F unit 3103. The memory unit 3102 stores the image data on which the signal processing has been performed by the signal processing unit 3101. The memory unit 3102 has a capacity capable of storing image data of, for example, one frame (all pixel circuits of the pixel unit 3100).

The image processing unit 3104 is, for example, a digital signal processor (DSP), and performs predetermined image processing on image data stored in the memory unit 3102. In the first embodiment, the image processing unit 3104 performs detection processing of detecting a predetermined specific object contained in an image (captured image) based on the image data stored in the memory unit 3102. The image processing unit 3104 detects a specific object by performing, for example, detection processing based on pattern recognition by a known technique. Not limited to this, the image processing unit 3104 may detect a specific object by using an approach such as deep learning. When a specific object is detected from a captured image stored in the memory unit 3102, the image processing unit 3104 writes a detection flag indicating that fact in the memory unit 3102.

The I/F unit 3103 is an interface that controls communication between the imaging unit 3003 and the outside. An interface corresponding to, for example, a mobile industry processor interface (MIPI) can be applied to the I/F unit 3103. Not limited to this, the I/F unit 3103 may apply a unique type of interface for the imaging unit 3003.

For example, the I/F unit 3103 outputs image data transferred from the signal processing unit 3101 or image data (captured image) stored in the memory unit 3102 to the outside of the imaging unit 3003. For example, the I/F unit 3103 outputs specified image data among the image data transferred from the signal processing unit 3101 and the image data stored in the memory unit 3102 to the outside in accordance with an instruction from the outside.

The element control unit 3105 controls the overall operation of the imaging unit 3003. For example, the element control unit 3105 generates a timing signal for synchronously controlling the operations of the row scanning circuit, the AD converter, and the column scanning circuit in the pixel unit 3100. Furthermore, the element control unit 3105 controls timing for the image processing unit 3104 to start image processing.

Although, in the above description, the pixel unit 3100, the signal processing unit 3101, the memory unit 3102, the I/F unit 3103, the image processing unit 3104, and the element control unit 3105 included in the imaging unit 3003 are formed on one substrate, this example is not a limitation. For example, the imaging unit 3003 may be a laminated CIS formed by laminating a plurality of semiconductor chips.

Figure 6:
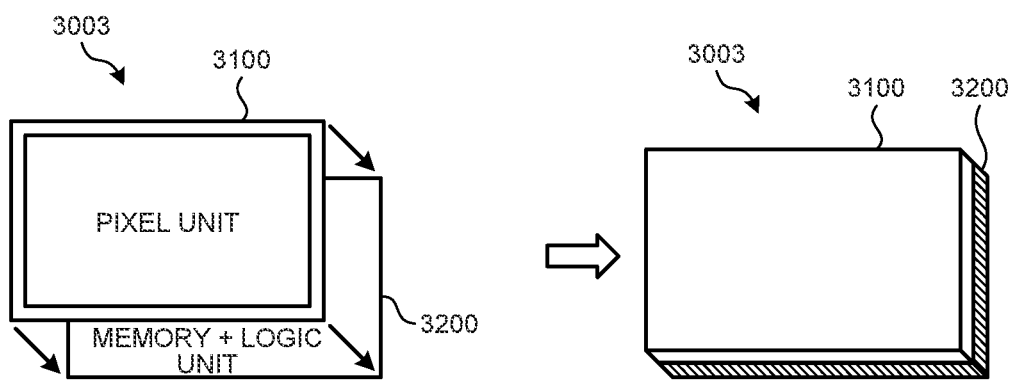
FIG. 6 illustrates an example in which the imaging unit according to the first embodiment is formed by a laminated CIS having two-layer structure.

In one example, the imaging unit 3003 can be formed by a two-layer structure in which two layers of semiconductor chips are laminated. FIG. 6 illustrates an example in which the imaging unit 3003 according to the first embodiment is formed by a laminated CIS having the two-layer structure. In the structure in FIG. 6, the pixel unit 3100 is formed on a semiconductor chip of the first layer, and a memory+logic unit 3200 is formed on a semiconductor chip of the second layer. The memory+logic unit 3200 includes, for example, the signal processing unit 3101, the memory unit 3102, the I/F unit 3103, the image processing unit 3104, and the element control unit 3105. Note that the semiconductor chip of the first layer may include the pixel unit 3100 and the signal processing unit 3101. As illustrated on the right of FIG. 6, the imaging unit 3003 is configured as one solid-state imaging element by bringing the semiconductor chip of the first layer and the semiconductor chip of the second layer into electrical contact with each other and sticking these semiconductor chips together.

Figure 7:
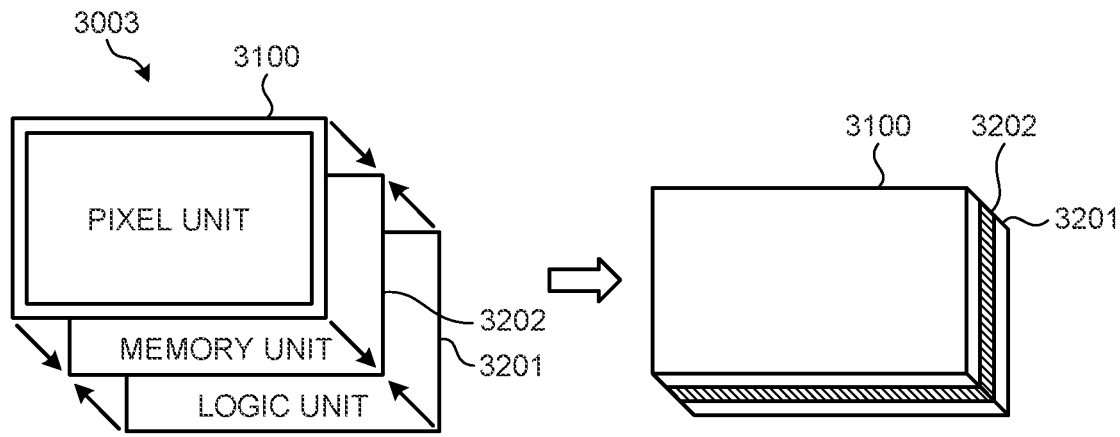
FIG. 7 illustrates an example in which the imaging unit according to the first embodiment is formed by a laminated CIS having three-layer structure.

In another example, the imaging unit 3003 can be formed by a three-layer structure in which three layers of semiconductor chips are laminated. FIG. 7 illustrates an example in which the imaging unit 3003 according to the first embodiment is formed by a laminated CIS having the three-layer structure. In the structure in FIG. 7, the pixel unit 3100 is formed on a semiconductor chip of the first layer, the memory unit 3102 is formed on a semiconductor chip of the second layer, and a logic unit 3201 is formed on a semiconductor chip of the third layer. In this case, the logic unit 3201 includes, for example, the signal processing unit 3101, the I/F unit 3103, the image processing unit 3104, and the element control unit 3105. Note that the semiconductor chip of the first layer may include the pixel unit 3100 and the signal processing unit 3101. As illustrated on the right of FIG. 7, the imaging unit 3003 is configured as one solid-state imaging element by bringing the semiconductor chip of the first layer, the semiconductor chip of the second layer, and the semiconductor chip of the third layer into electrical contact with each other and sticking these semiconductor chips together.

Figure 8:
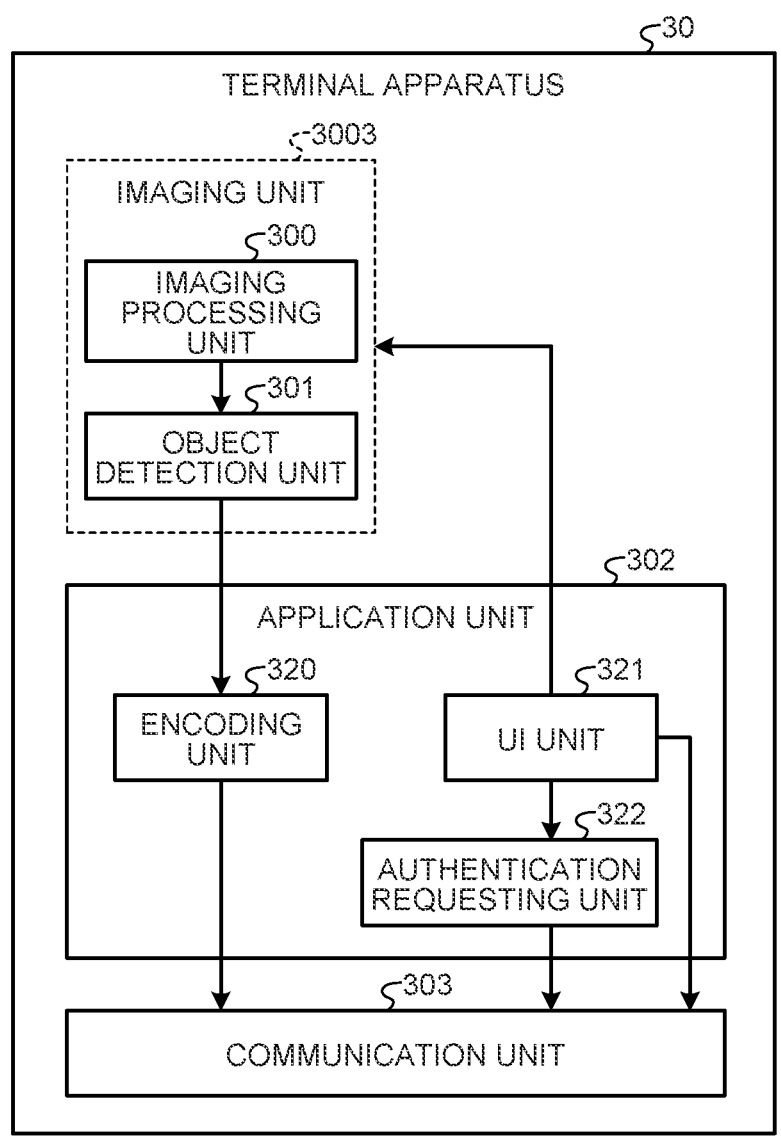
FIG. 8 is a functional block diagram illustrating one example of the function of the terminal apparatus according to the first embodiment.

FIG. 8 is a functional block diagram illustrating one example of the function of the terminal apparatus 30 according to the first embodiment. In FIG. 8, the terminal apparatus 30 includes an imaging processing unit 300, an object detection unit 301, an application unit 302, and a communication unit 303. Furthermore, the application unit 302 includes an encoding unit 320, a UI unit 321, and an authentication requesting unit 322.

Functions of the imaging processing unit 300 and the object detection unit 301 among these units are implemented in the imaging unit 3003 described with reference to FIG. 5. For example, the imaging processing unit 300 corresponds to the functions of the pixel unit 3100, the signal processing unit 3101, and the element control unit 3105 in FIG. 5. Furthermore, the object detection unit 301 corresponds to the functions of the memory unit 3102 and the image processing unit 3104 in FIG. 5.

In FIG. 8, the function of the application unit 302 is implemented by, for example, the above-described SNS app.

A program (SNS app) for implementing each function in the application unit 302 (encoding unit 320, UI unit 321, and authentication requesting unit 322) of the terminal apparatus 30 is stored on a computer connected to a network such as the Internet, and provided by being downloaded via the network. Furthermore, the program may be configured so as to be provided or distributed via a network such as the Internet. Moreover, the program may be recorded in a computer-readable recording medium, such as a compact disk (CD), a flexible disk (FD), and a digital versatile disk (DVD), in a file of an installable or executable format, and provided.

The program has a module configuration including the encoding unit 320, the UI unit 321, and the authentication requesting unit 322. As actual hardware, each of the above-described units is loaded on a main storage apparatus such as the RAM 3002 by the CPU 3000 reading the program from a storage medium such as the ROM 3001 and the storage 3005 and executing the program, and the encoding unit 320, the UI unit 321, and the authentication requesting unit 322 are generated on the main storage apparatus.

In the application unit 302, the encoding unit 320 performs encoding processing such as compression encoding on a captured image output from the imaging unit 3003. Here, a joint photographic experts group (JPEG) method is applied as a compression encoding method to be performed on a captured image. In the JPEG method, an image is divided into blocks of a fixed size (e.g., 8 pixels×8 pixels). Discrete cosine transform is performed in units of the block to convert image information from information of a space region to that of a frequency region. Hereinafter, the block is referred to as a discrete cosine transform (DCT) block. The encoding unit 320 performs quantization processing and Huffman compression processing on the image that has been converted into the information of a frequency region, and reduces the information amount. The encoding unit 320 then compresses and encodes an original image.

The encoding unit 320 stores the compressed and encoded image in a file in a predetermined format. At this time, the encoding unit 320 can further store metadata related to the image in the file. When an image is compressed and encoded in the JPEG method, the encoding unit 320 can store the compressed and encoded image in a file of exchangeable image file format (Exif). The metadata is stored in an application marker segment region specified in the Exif format.

The user interface (UI) unit 321 provides a user interface for user operations. The UI unit 321 generates a display control signal for displaying an operation screen to the display device 3020. Furthermore, the UI unit 321 receives user operation to the input device 3006, and controls the operation of each unit (e.g., imaging unit 3003 and authentication requesting unit 322) of the terminal apparatus 30 in accordance with the user operation.

The authentication requesting unit 322 transmits authentication information (account information) for logging in to the SNS and an authentication request related to the authentication information to the server 10, and requests authentication of the terminal apparatus 30. The authentication requesting unit 322 can, for example, store, in a non-volatile manner, the account information input by the user 31 in a predetermined region of the storage 3005. The authentication requesting unit 322 can automatically transmit the stored account information to the server 10 at the time of start of the SNS app.

The communication unit 303 communicates with the network 2 under the control of the UI unit 321. A captured image encoded by the encoding unit 320 and stored in a file and account information from the authentication requesting unit 322 are transmitted with the communication unit 303.

Figure 9:
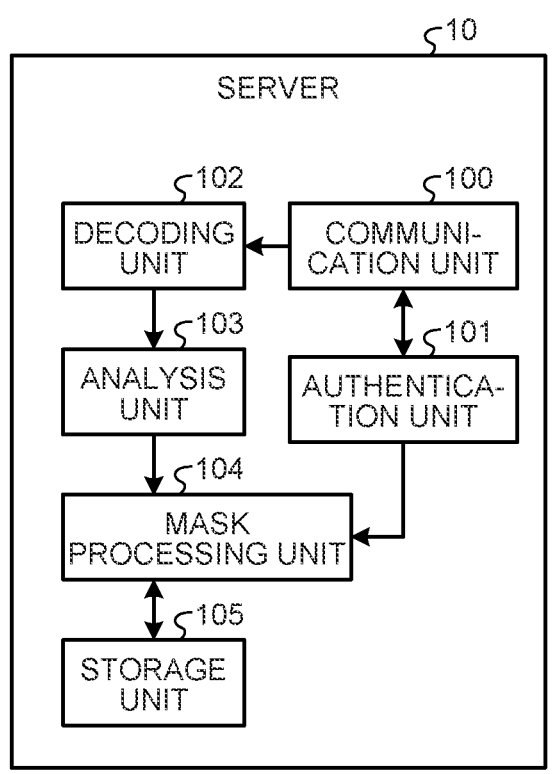
FIG. 9 is a functional block diagram illustrating one example of the function of the server according to the first embodiment.

FIG. 9 is a functional block diagram illustrating one example of the function of the server 10 according to the first embodiment. In FIG. 9, the server 10 includes a communication unit 100, an authentication unit 101, a decoding unit 102, an analysis unit 103, a mask processing unit 104, and a storage unit 105. The communication unit 100, the authentication unit 101, the decoding unit 102, the analysis unit 103, the mask processing unit 104, and the storage unit 105 are implemented by a program that runs on the CPU 1000. Not limited to this, a part or all of the communication unit 100, the authentication unit 101, the decoding unit 102, the analysis unit 103, the mask processing unit 104, and the storage unit 105 may be configured by a hardware circuit that operates in cooperation with each other.

The communication unit 100 communicates with the network 2. The authentication unit 101 performs authentication processing in response to an authentication request containing account information received by the communication unit 100. The decoding unit 102 decodes an image received by the communication unit 100, and decodes a compressed code while acquiring metadata attached to the image. The analysis unit 103 analyzes the decoded image decoded by the decoding unit 102, and detects a specific object contained in the decoded image.

The mask processing unit 104 performs mask processing on the image in accordance with an analysis result of the analysis unit 103. At this time, the mask processing unit 104 can perform mask processing on the compressed and encoded image before being decoded by the decoding unit 102. Furthermore, the mask processing unit 104 also cancels the mask processing performed on the image. The mask processing unit 104 executes mask processing and mask canceling processing in accordance with an authentication result of the authentication unit 101.

The storage unit 105 stores the image output from the mask processing unit 104 in, for example, the storage 1003. Furthermore, the storage unit 105 also performs processing of reading an image from the storage 1003. Hereinafter, unless otherwise specified, processing of the storage unit 105 storing an image in the storage 1003 is described as "storing an image in the storage unit 105", and processing of reading an image from the storage 1003 is described as "reading an image from the storage unit 105".

A program for implementing each function according to the first embodiment in the server 10 is recorded in a computer-readable recording medium, such as a compact disk (CD), a flexible disk (FD), and a digital versatile disk (DVD), in a file of an installable or executable format, and provided. Not limited to this, the program may be provided by storing the program on a computer connected to a network such as the Internet and downloading the program via the network. Furthermore, the program may be configured so as to be provided or distributed via a network such as the Internet.

The program has a module configuration including the communication unit 100, the authentication unit 101, the decoding unit 102, the analysis unit 103, the mask processing unit 104, and the storage unit 105. As actual hardware, each of the above-described units is loaded on a main storage apparatus such as the RAM 1002 by the CPU 1000 reading the program from a storage medium such as the ROM 1001 and the storage 1003 and executing the program, and the communication unit 100, the authentication unit 101, the decoding unit 102, the analysis unit 103, the mask processing unit 104, and the storage unit 105 are generated on the main storage apparatus.

Details of Processing According to First Embodiment

Figure 10:
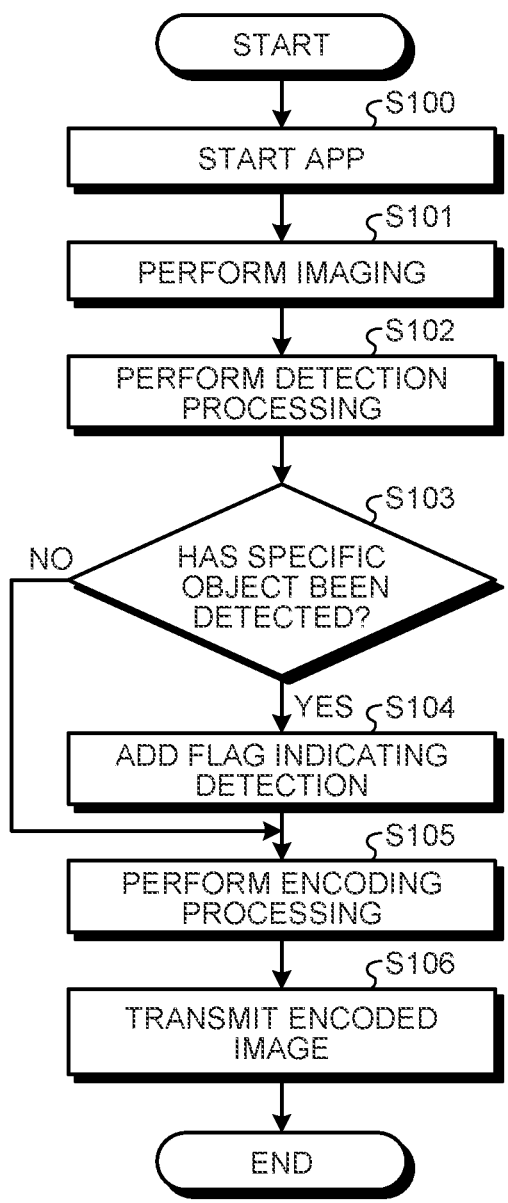
FIG. 10 is a flowchart illustrating one example of upload processing for a captured image performed by the terminal apparatus according to the first embodiment.

Next, processing in the information processing system 1 according to the first embodiment will be described in more detail. FIG. 10 is a flowchart illustrating one example of upload processing for a captured image performed by the terminal apparatus 30 according to the first embodiment. Note that, prior to the execution of the processing according to the flow in FIG. 10, the terminal apparatus 30 is mounted with application software (SNS app) corresponding to a service (e.g., SNS) provided by the information processing system 1 according to the first embodiment. Furthermore, the user 31 of the terminal apparatus 30 has pre-registered account information for logging in to the SNS in the server 10.

In Step S100, the SNS app is started in the terminal apparatus 30 in response to user operation. When the SNS app is started, the authentication requesting unit 322 transmits the account information to the server 10, and requests authentication. The server 10 performs authentication with the authentication unit 101 based on the account information that has been transmitted from the terminal apparatus 30. When the authentication is successful, the SNS provided by the server 10 is made usable from the terminal apparatus 30.

The terminal apparatus 30 performs imaging with the imaging processing unit 300 in response to user operation that gives an instruction to perform imaging (Step S101). The captured image acquired by the imaging is passed to the object detection unit 301. In the next Step S102, the terminal apparatus 30 executes detection processing for a specific object on the captured image passed from the imaging processing unit 300 with the object detection unit 301. The specific object is, for example, an image in which personal information can be identified. For example, a face, a license plate of a vehicle, and an open window can be applied to the specific object. The object detection unit 301 detects a specific object by a detection method based on known pattern recognition. Note that the object detection unit 301 and the CPU 3000 of the terminal apparatus 30 may execute the detection processing for a specific object in cooperation.

Note that, although the captured image that has been captured and acquired in Step S101 is here applied as a target of the specific object detection in Step S102, this example is not a limitation. For example, the terminal apparatus 30 may perform the specific object detection with the object detection unit 301 in Step S102 for a captured image, which has been captured by the imaging unit 3003 and then stored in, for example, the storage 3005. For example, the object detection unit 301 executes detection processing for a specific object on the captured image read from the storage 1003 in response to, for example, user operation.

In the next Step S103, the terminal apparatus 30 determines whether or not the object detection unit 301 has detected a specific object from the captured image. When determining that at least one specific object has been detected from the captured image (Step S103, "Yes"), the object detection unit 301 shifts the processing to Step S104.

In Step S104, the terminal apparatus 30 adds a detection flag indicating that a specific object has been detected to the captured image with the object detection unit 301. For example, the detection flag uses a value "1" to indicate that a specific object has been detected, and uses a value "0" to indicate that a specific object has not been detected. Furthermore, the default value of the detection flag is set to "0". In Step S104, the value of the detection flag is changed from "0" to "1". As described above, when the object detection unit 301 and the CPU 3000 execute the detection processing for an object in cooperation, the object detection unit 301 may add the detection flag, or the CPU 3000 may add the detection flag.

Figure 11:
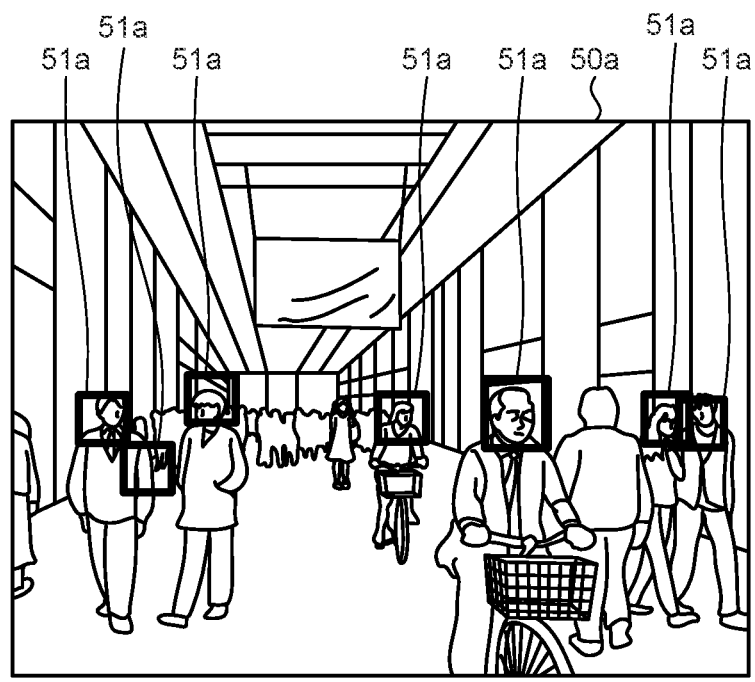
FIG. 11 schematically illustrates how a specific object is detected from a captured image, which is applicable to the first embodiment.
Figure 12:
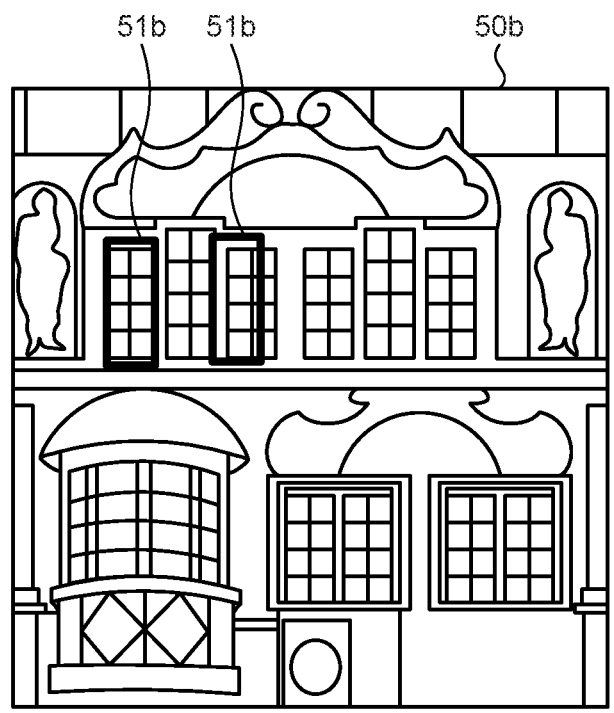
FIG. 12 schematically illustrates how a specific object is detected from a captured image, which is applicable to the first embodiment.

FIGS. 11 and 12 schematically illustrate how a specific object is detected from a captured image, which is applicable to the first embodiment. FIG. 11 illustrates an example in the case where the specific object is a face. In the example of FIG. 11, in a captured image 50a, each rectangular region 51a containing a face is detected as a specific object region. FIG. 12 illustrates an example in the case where the specific object is an open window. In the example of FIG. 12, as in the example of FIG. 11, in a captured image 50b, each rectangular region 51b containing an open window is detected as a specific object region.

In contrast, when determining that no specific object has been detected from the captured image in Step S103 (Step S103, "No"), the object detection unit 301 skips the processing of Step S104, and shifts the processing to Step S105. In this case, the value of the detection flag is maintained at "0".

In Step S105, the terminal apparatus 30 performs encoding processing on the captured image acquired in Step S101 with the encoding unit 320. For example, the encoding unit 320 compresses and encodes the captured image by the JPEG method, and stores the compressed and encoded image in an Exif format file. Furthermore, the encoding unit 320 causes the detection flag to be contained in the metadata of the captured image, and stores the detection flag in the application marker segment region specified in the Exif format.

In the next Step S106, the terminal apparatus 30 transmits the captured image that has been encoded in Step S105 and stored in the file to the server 10 in response to the user operation with the communication unit 303.

Note that, although, in the above description, the specific object detection is described to be performed for a still image in the processing according to the flowchart of FIG. 10, this example is not a limitation. For example, the processing according to the flowchart of FIG. 10 may be performed for a moving image. In this case, in Step S102, the terminal apparatus 30 executes detection processing for a specific object for each frame of the moving image with the object detection unit 301. In the terminal apparatus 30, the object detection unit 301 adds a detection flag of a value "1" to the frame in which a specific object has been detected (Step S103, "Yes") as metadata of the frame (Step S104).

In Step S105, the terminal apparatus 30 compresses and encodes the moving image by a predetermined method such as an H.264 (ITU-T Rec. H.264| ISO/IEC 14496-10 advanced video coding) method with the encoding unit 320. In Step S106, the terminal apparatus 30 transmits the compressed and encoded moving image to the server 10. Although, in the above description, the detection flag is described to be added for each frame as metadata, this example is not a limitation. For example, data in which a plurality of frames of detection flags is associated with frame numbers may be separately created and added to moving image data as the metadata. Furthermore, the terminal apparatus 30 may transmit the moving image to the server 10 as a file, or may transmit the moving image as stream data.

Figure 13:
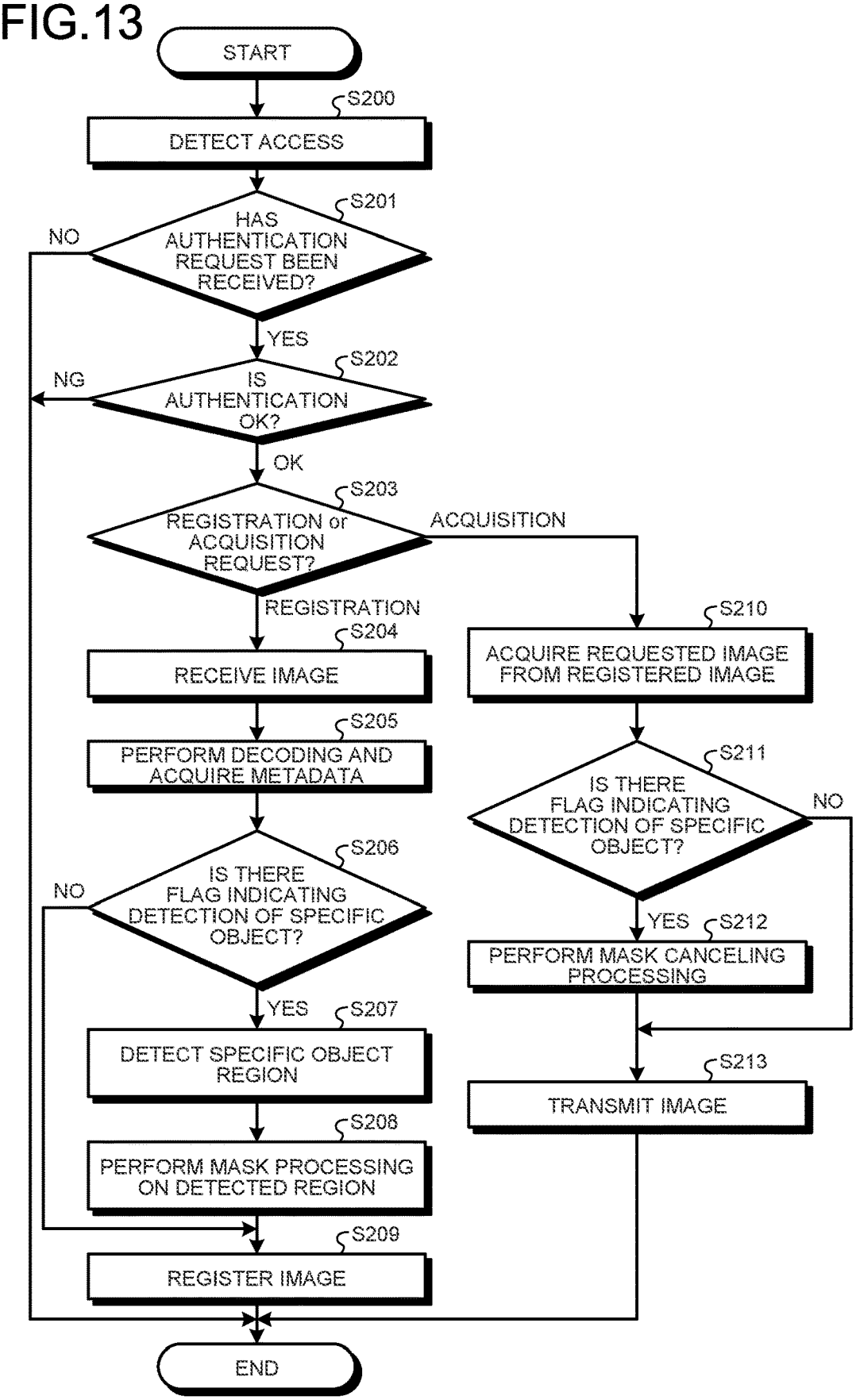
FIG. 13 is a flowchart illustrating one example of processing in the server according to the first embodiment.

FIG. 13 is a flowchart illustrating one example of processing in the server 10 according to the first embodiment. In Step S200, the server 10 detects access via the network 2 with the communication unit 100. In the next Step S201, the server 10 determines whether or not the access that has been detected in Step S200 comes from an access source that has received an authentication request with the authentication unit 101.

When determining that the access that has been detected in Step S200 has not received the authentication request with the authentication unit 101 (Step S201, "No"), the server 10 ends the series of pieces of processing according to the flowchart of FIG. 13. Not limited to this, the authentication unit 101 may request account information from the access, and prompt authentication processing.

In contrast, when determining that the access that has been detected in Step S200 has received the authentication request with the authentication unit 101 (Step S201, "Yes"), the server 10 shifts the processing to Step S202. In Step S202, the authentication unit 101 determines whether or not the authentication for the received authentication request is successful. When determining that the authentication for the received authentication request is not successful (Step S202, "NG"), the authentication unit 101 ends the series of pieces of processing according to the flowchart of FIG. 13.

In contrast, when determining that the authentication for the received authentication request is successful with the authentication unit 101 (Step S202, "OK"), the server 10 shifts the processing to Step S203. In Step S203, the server 10 determines which of registration and acquisition of an image the access that has been detected in Step S200 requests with, for example, the communication unit 100. When determining that the access that has been detected in Step S200 requests image registration (Step S203, "registration"), the communication unit 100 shifts the processing to Step S204. In contrast, when determining that the access that has been detected in Step S200 requests image acquisition with the communication unit 100 (Step S203, "acquisition"), the server 10 shifts the processing to Step S210.

Note that, when determining that the access that has been detected in Step S200 is neither registration nor acquisition of an image in Step S203, the communication unit 100 can end the series of pieces of processing according to the flowchart of FIG. 13, and shift the processing to another pieces of processing, for example.

In Step S204, the server 10 receives a file, in which the image is stored, with the communication unit 100. The file has been transmitted from the access source whose access has been detected in Step S200. The access source is, for example, the terminal apparatus 30. The communication unit 100 receives the file in which the captured image is stored. The captured image has been transmitted in Step S106 in the flowchart of FIG. 10.

In the next Step S205, the server 10 takes out the compressed and encoded captured image from the file that has been received in Step S204, and decodes the captured image with the decoding unit 102 to decode the captured image. The decoded captured image that has been decoded is bitmap data having luminance information and color information for each pixel. Note that the decoding unit 102 also holds a compressed and encoded captured image stored in a file. Furthermore, the decoding unit 102 acquires metadata from the file.

In the next Step S206, the server 10 determines whether or not the metadata that has been acquired in Step S205 contains a detection flag indicating that a specific object has been detected with the decoding unit 102. When determining that the detection flag is not contained (Step S206, "No"), the decoding unit 102 shifts the processing to Step S209. In contrast, when determining that the detection flag is contained (Step S206, "Yes"), the decoding unit 102 shifts the processing to Step S207.

In Step S207, the server 10 analyzes the captured image that has been decoded in Step S205 with the analysis unit 103, detects all specific objects that can be detected from the captured image, and acquires a rectangular region including each of the detected specific objects. The analysis unit 103 passes coordinates of the acquired rectangular region including all the specific objects (hereinafter, referred to as a specific object region) to the mask processing unit 104.

In the next Step S208, the server 10 performs reversible mask processing on a region corresponding to the specific object region of the compressed and encoded captured image, which is held by the decoding unit 102 in Step S204, based on the coordinates of the specific object region passed from the analysis unit 103 with the mask processing unit 104.

Figure 14:
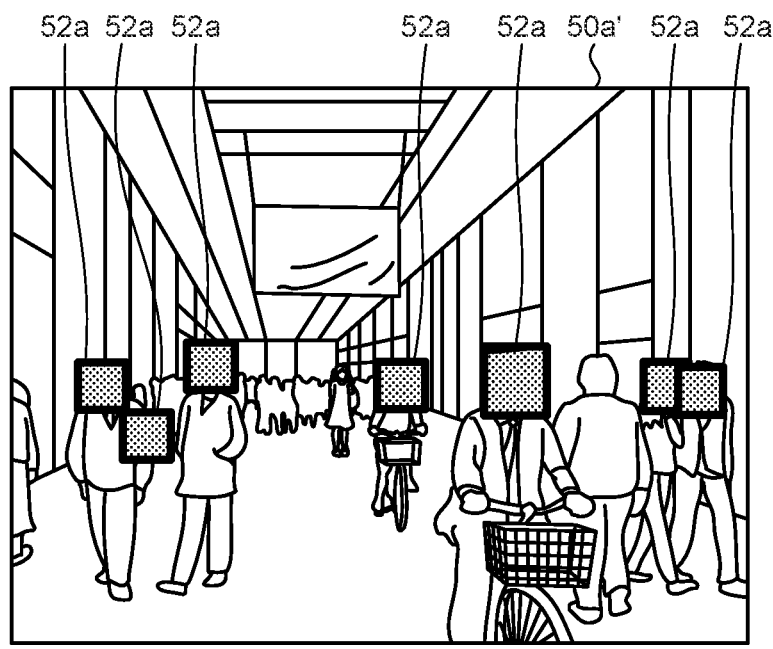
FIG. 14 illustrates an example in which mask processing is performed on each of rectangular regions included in a captured image, according to the first embodiment.
Figure 15:
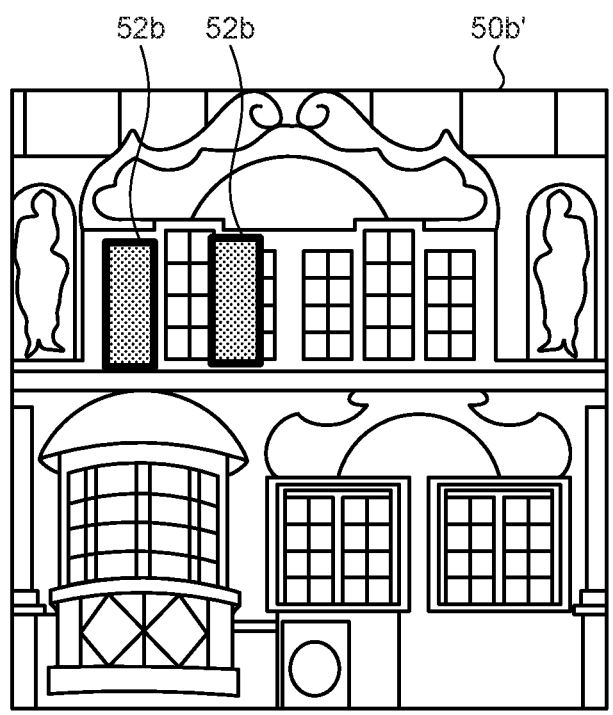
FIG. 15 illustrates an example in which mask processing is performed on each of rectangular regions included in a captured image, according to the first embodiment.

FIG. 14 illustrates an example in which mask processing is performed on each of the above-described rectangular regions 51a included in the captured image 50a illustrated in FIG. 11, according to the first embodiment. In FIG. 14, in the captured image 50a', each of rectangular regions 52a corresponding to each of the rectangular regions 51a in FIG. 11 is covered with a mask, and a face included in each rectangular region 51a is beyond recognition. Similarly, FIG. 15 illustrates an example in which mask processing is performed on each of the above-described rectangular regions 51b included in the captured image 50b illustrated in FIG. 12, according to the first embodiment. In FIG. 15, in the captured image 50b', each of rectangular regions 52b corresponding to each of the rectangular regions 51b in FIG. 12 is covered with a mask, and an open window included in each rectangular region 51b is beyond recognition.

In this way, the mask processing can make an object, from which personal information can be identified, included in the original captured images 50a and 50b unidentifiable.

The reversible mask processing performed by the mask processing unit 104 will be described with reference to a more specific example. The mask processing unit 104 makes information in a rectangular region of an image beyond recognition by rearranging the information in the rectangular region, and can cover the rectangular region with a mask. Furthermore, the mask can be canceled and the information in the rectangular region can be returned to the original easily recognizable information by rearranging the information in the rectangular region covered with a mask in the original order.

The mask processing unit 104 rearranges the information in the rectangular region by, for example, encrypting the information in the rectangular region. The mask processing unit 104 encrypts the information in the rectangular region with a preliminarily given key, and covers the information with a mask. The mask processing unit 104 decrypts the code in the rectangular region with the key, and rearranges the information in the rectangular region in the original order. A method of rearranging information by performing replacement and transposition in accordance with a predetermined key can be applied as an example of such encryption. Not limited to this, encryption using a hash function such as secure hash algorithm-1 (SHA-1) and message digest algorithm 5 (MD5) may be performed.

Figure 16:
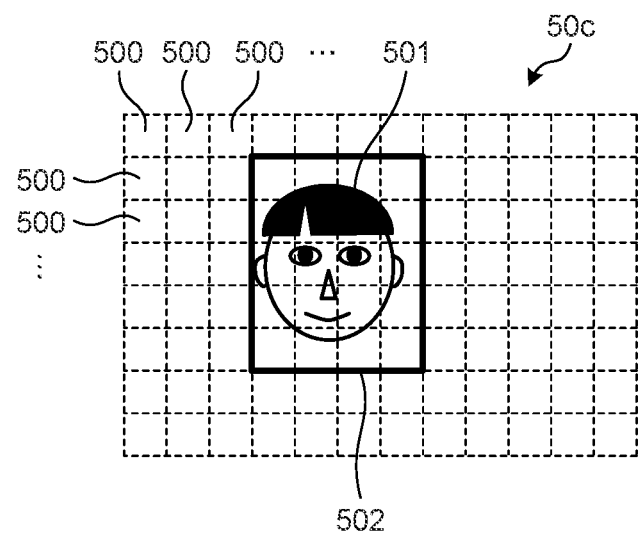
FIG. 16 schematically illustrates an example of a method of encrypting a rectangular region in an image compressed and encoded by a JPEG method, which is applicable to the first embodiment.

Here, when an image is compressed and encoded by the JPEG method, a data format of the JPEG method needs to be encrypted. An example of a method of encrypting a rectangular region in an image compressed and encoded by the JPEG method, which is applicable to the first embodiment, will be schematically described with reference to FIG. 16. In FIG. 16, an image 50c is a bitmap image, and contains a face 501 as a specific object. Generally, in the JPEG method, as described above, compression encoding processing is performed in units of DCT blocks having a fixed size of 8 pixels×8 pixels.

For example, the image 50c is divided into blocks 500 of 8 pixels×8 pixels corresponding to the DCT blocks, and a rectangular region 502 formed of a plurality of blocks 500 including the face 501 is extracted. It is conceivable to encrypt the data compressed and encoded by the JPEG method in units of DCT blocks corresponding to the blocks 500 included in the rectangular region 502.

Note that, although, in the above description, the mask processing unit 104 has been described to perform mask processing for each specific object region, this example is not a limitation. For example, the mask processing unit 104 may encrypt the entire captured image contained in the file that has been received in Step S204. Moreover, the mask processing unit 104 can also encrypt the file itself that has been received in Step S204.

Furthermore, although, in the above description, the mask processing unit 104 has been described to perform mask processing for a compressed and encoded captured image, this example is not a limitation. For example, the mask processing unit 104 may perform mask processing on the captured image that has been decoded in Step S205 and used as a bitmap image, and may again compress and encode the captured image, which has been subject to the mask processing and is formed by the bitmap image, by the JPEG method.

Returning to the description of the flowchart of FIG. 13, the server 10 performs the mask processing in Step S208 with the mask processing unit 104, and shifts the processing to Step S209.

In Step S209, the server 10 stores a captured image (image file) on which the mask processing has been performed in Step S208 or a captured image (image file) that has been received in Step S204 in the case where the processing is shifted from Step S206 to the Step S209 in, for example, the storage 1003 with the storage unit 105, and registers the captured image in the SNS. At this time, the storage unit 105 stores information indicating the position of each specific object region that has been detected in Step S207 in the storage 1003 in association with the captured image. When the captured image is registered in the SNS, the series of pieces of processing according to the flowchart of FIG. 13 is ended.

Note that, when the image received in Step S204 is a compressed and encoded moving image, the server 10 decodes the compressed code of the moving image that has been received in Step S205 with the decoding unit 102, and generates a bitmap image for each frame (Step S205). Furthermore, the server 10 detects a specific object region with the analysis unit 103 for each frame, which is a bitmap image, based on a detection flag added to the moving image as the metadata acquired by the decoding unit 102 (Steps S206 and S207). The server 10 performs the mask processing on the detected specific object region with the mask processing unit 104 (Step S208).

The server 10 compresses and encodes the moving image in a predetermined method such as the H.264 method. The mask processing has been performed on the moving image in Step S208, and the moving image contains each frame, which is a bitmap image. The server 10 stores the compressed and encoded moving image in, for example, the storage 1003 with, for example, the storage unit 105, and registers the moving image in the SNS (Step S209). Not limited to this, the server 10 may store a moving image, which is not compressed and encoded and whose frame is a bitmap image, in the storage 1003. The storage unit 105 stores information indicating the position of each specific object region that has been detected in each frame in the storage 1003 in association with each frame.

When the access detected in Step S200 is determined to request acquisition of an image in the above-described Step S203 (Step S203, "acquisition"), the processing is shifted to Step S210. In Step S210, the storage unit 105 in the server 10 acquires a file in which a captured image requested to be acquired is stored from a registered image, which is stored in, for example, the storage 1003 and has been registered in the SNS.

In the next Step S211, the server 10 determines whether or not the metadata stored in the file that has been acquired in Step S210 contains a detection flag indicating that a specific object has been detected with the mask processing unit 104. When determining that the detection flag is not contained (Step S211, "No"), the mask processing unit 104 shifts the processing to Step S213.

In contrast, when determining that the detection flag is contained with the mask processing unit 104 (Step S211, "Yes"), the server 10 shifts the processing to Step S212. In Step S212, the mask processing unit 104 cancels the mask applied to the captured image based on information indicating the position of the specific object region associated with the captured image that has been acquired in Step S210. For example, when the mask is applied by encrypting the specific object region in the captured image, the mask processing unit 104 decrypts the code. This operation enables the captured image to be viewed in the state at the time of being received in Step S204 without being masked.

In the next Step S213, the server 10 transmits the captured image that has been acquired in Step S210 (when a detection flag indicating that a specific object has been detected is not contained) or the captured image whose mask is canceled in Step S212 (when the detection flag is contained) to the access source whose access has been detected in Step S200 with the communication unit 100. When the captured image is transmitted, the series of pieces of processing according to the flowchart of FIG. 13 is ended.

Note that, when the access detected in Step S200 comes from an access source that has not been authenticated in the authentication processing performed by the server 10 (e.g., unauthorized access from the terminal apparatus 41), the processing of Step S211 is not executed. Thus, when a captured image registered in the SNS is acquired by unauthorized access, the acquired captured image remains masked, and an image contained in a specific object region cannot be identified. Consequently, scattering of personal information contained in the specific object region can be inhibited.

Note that, when the image requested to be acquired in Step S203 is a moving image and the moving image is compressed and encoded, the server 10 decodes the compressed code of the moving image that has been acquired from the registered image in Step S210 with the decoding unit 102, and generates a bitmap image for each frame. In addition, the server 10 acquires the detection flag that has been added to the moving image as metadata. Note that, when the image requested to be acquired is a moving image that has not been compressed and encoded and stored in the storage 1003, the decoding processing for a compressed code is omitted.

The server 10 cancels a mask applied to a frame, to which a detection flag of a value "1" is added (Step S211), with the mask processing unit 104 based on information indicating the position of a specific object region associated with the frame (Step S212). The server 10 compresses and encodes each frame whose mask has been canceled in a predetermined method such as the H.264 method with, for example, the mask processing unit 104, and transmits the frame (Step S213).

Figure 17:
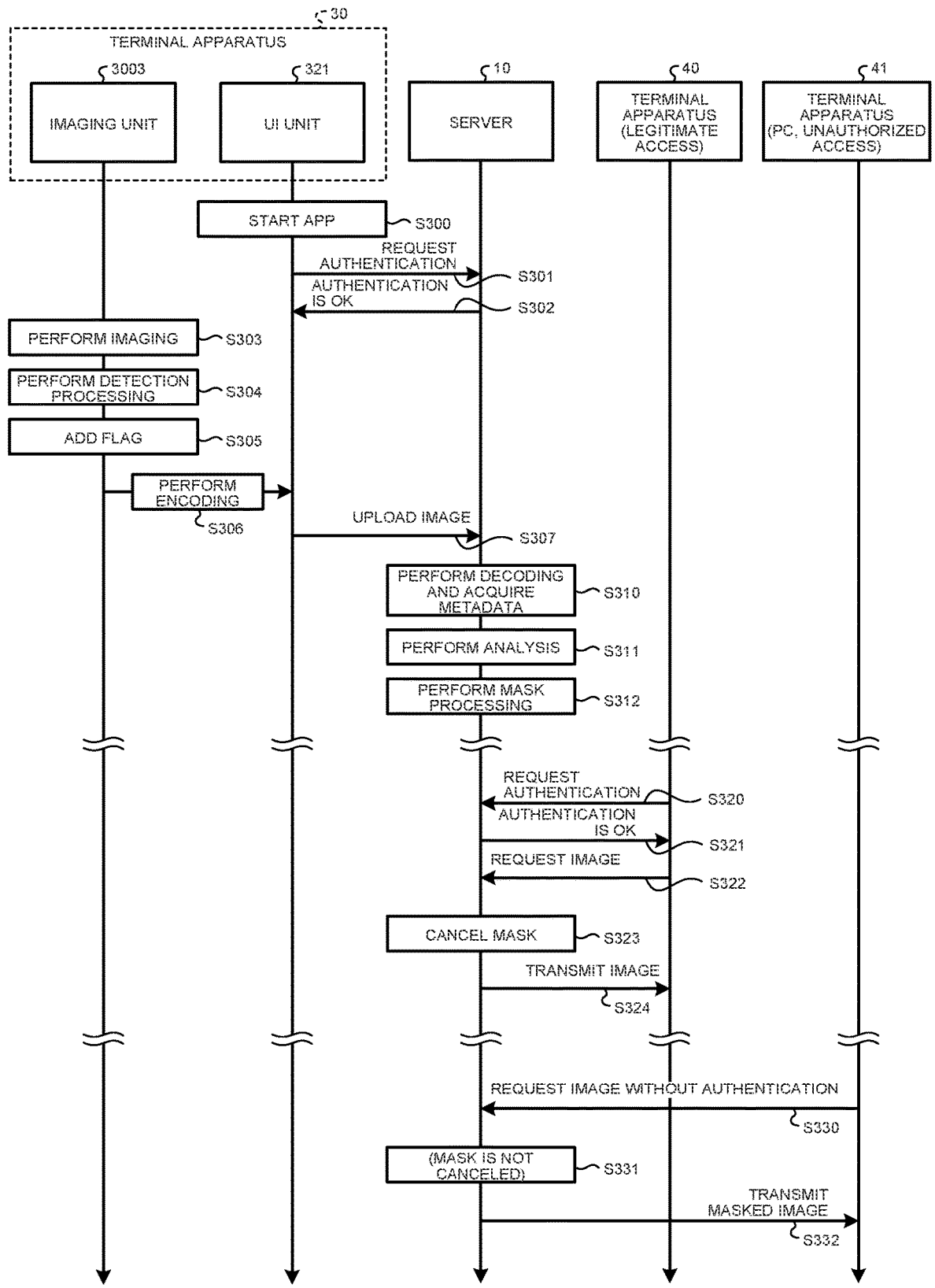
FIG. 17 is a sequence chart illustrating one example of the overall operation of the information processing system according to the first embodiment.

FIG. 17 is a sequence chart illustrating one example of the overall operation of the information processing system 1 according to the first embodiment. Note that, in the following description, the terminal apparatus 30 transmits a captured image, which is a still image, captured by the imaging unit 3003 to the server 10.

When the mounted SNS app is started in the terminal apparatus 30 (Step S300), the authentication requesting unit 322 of the application unit 302 transmits account information to the server 10, and requests authentication from the server 10 (Step S301). When the account information transmitted from the terminal apparatus 30 is appropriate, the server 10 notifies the terminal apparatus 30 that the authentication has been performed (Step S302). This makes the function of the SNS provided by the server 10 usable from the terminal apparatus 30.

After authenticating the terminal apparatus 30, in the terminal apparatus 30, an imaging processing unit 309 of the imaging unit 3003 captures an image in response to user operation, and a captured image is acquired (Step S303). The terminal apparatus 30 detects, with the object detection unit 301, a specific object for the captured image acquired by the imaging with the imaging unit 3003 (Step S304). When a specific object is detected from the captured image, the object detection unit 301 adds a detection flag indicating that the specific object has been detected to the captured image (Step S305), and passes the captured image to which the detection flag is added to the application unit 302. The captured image is passed to the encoding unit 320 in the application unit 302.

The terminal apparatus 30 performs encoding processing on the captured image that has been passed from the object detection unit 301 with the encoding unit 320 (Step S306). The encoding processing compresses and encodes the captured image in, for example, the JPEG method, and adds metadata containing the detection flag to the captured image. The encoding unit 320 stores each piece of encoded data in a file of a predetermined format (e.g., Exif format), and passes the data to the communication unit 303. The communication unit 303 transmits the file, in which each piece of data passed by the encoding unit 320 is stored, to the server 10, and uploads the captured image to the server 10 in response to, for example, user operation (Step S307).

When receiving the file in which the captured image uploaded from the terminal apparatus 30 is stored, the server 10 performs decoding processing on the received file with the decoding unit 102 (Step S310). That is, the decoding unit 102 acquires metadata from the received file. With the operation, the decoding unit 102 decodes the compressed and encoded captured image stored in the file. The decoding unit 102 passes the decoded captured image that has been decoded to the analysis unit 103, and holds the captured image before decoding.

When the metadata acquired from the file contains a detection flag indicating that a specific object has been detected from the captured image stored in the file, the server 10 analyzes the decoded captured image that has been passed from the decoding unit 102 with the analysis unit 103, and detects all detectable specific objects contained in the decoded captured image (Step S311). The analysis unit 103 passes the position information indicating the position of the specific object that has been detected from the decoded captured image to the mask processing unit 104. The mask processing unit 104 performs mask processing on the captured image (compressed and encoded captured image) before decoding, which is held in the decoding unit 102, based on the position information that has passed from the analysis unit 103 (Step S312). The server 10 registers the captured image, on which the mask processing is performed, in the SNS.

In FIG. 17, Steps S320 to S324 illustrate an example of processing in the case of accessing the server 10 by legitimate access, logging in to the SNS, and acquiring a captured image registered in the SNS. Account information from the SNS app is transmitted from, for example, the terminal apparatus 40 mounted with the SNS app to the server 10, and authentication is requested (Step S320). When the account information transmitted from the terminal apparatus 40 is appropriate, the server 10 notifies the terminal apparatus 40 that the authentication has been performed (Step S321). This makes the function of the SNS provided by the server 10 usable from the terminal apparatus 40.

The terminal apparatus 40 requests viewing of a captured image registered in the SNS from the server 10 with the SNS app in response to, for example, user operation (Step S322). The server 10 cancels a mask that has been applied on the captured image registered in the SNS in response to the request (Step S323). The server 10 transmits the captured image whose mask has been canceled to the terminal apparatus 40 (Step S324). The terminal apparatus 40 decodes the captured image, decodes the compressed code, and displays the captured image on a display. Since the mask applied to the specific object has been canceled in the captured image, the captured image can be viewed on the terminal apparatus 40 with the specific object being identifiable.

In FIG. 17, Steps S330 to S332 illustrate an example of processing in the case of accessing the server 10 by unauthorized access and acquiring a captured image registered in the SNS without logging in to the SNS. For example, it is assumed that a captured image registered in the SNS has been requested by performing access without authentication of the server 10 without transmitting account information and requesting authentication from the terminal apparatus 41 to the server 10 (Step S330).

The server 10 does not cancel a mask applied on a captured image for a request from an unauthenticated access source (Step S331). Consequently, the terminal apparatus 41 acquires a captured image covered with a mask (Step S332). Since the specific object remains covered with the mask in the captured image, the specific object cannot be identified in the captured image viewed on the terminal apparatus 41. Thus, even if the captured image is leaked from the terminal apparatus 41 to, for example, the Internet, scattering of personal information contained in the specific object is prevented.

As described above, in the first embodiment, whether treatment (mask processing) on a registered image is canceled or kept can be controlled in accordance with which of legitimate or unauthorized the access to the server 10 is, and a treated state and an untreated state for an image are compatible. Furthermore, since an image is kept treated for an unauthorized access, scattering of, for example, personal information contained in an image before treatment can be inhibited.

Variation of First Embodiment

Note that, in the above description, the terminal apparatus 30 detects whether or not a captured image contains at least one specific object (FIG. 10, Step S103). When the captured image contains at least one specific object, the server 10 analyzes the captured image, and detects a specific object region (FIG. 13, Step S207). This example is not a limitation. All specific objects that can be detected from a captured image may be detected in the terminal apparatus 30.

That is, the terminal apparatus 30 acquires a specific object region and the coordinates thereof for all the detected specific objects (e.g., Step S103 in FIG. 10). The terminal apparatus 30 adds the coordinates of all the acquired specific object regions to the captured image as metadata (e.g., Step S104 in FIG. 10).

In this case, since acquisition of a specific object region is not necessary on the side of the server 10, the processing of Step S207 (Step S311 in FIG. 17) in FIG. 13 can be omitted. In the server 10, the mask processing unit 104 executes mask processing on each specific object region based on the coordinates of each specific object region contained in the metadata added to the captured image (Steps S207 in FIG. 13 and Step S312 in FIG. 17).

According to the variation of the first embodiment, since each specific object region contained in a captured image is acquired on the side of the terminal apparatus 30, a load on the server 10 can be mitigated compared to the above-described processing of the first embodiment.

Second Embodiment

Next, a second embodiment will be described. In the above-described first embodiment, the server 10 registers a captured image on which mask processing has been reversibly performed, and cancels a mask of the captured image in response to a legitimate access. In contrast, in the second embodiment, the server 10 performs registration without performing mask processing on the captured image, and performs mask processing on the captured image in response to an acquisition request for a captured image by unauthorized access. In the second embodiment, an irreversible method can be used in mask processing.

Figure 18:
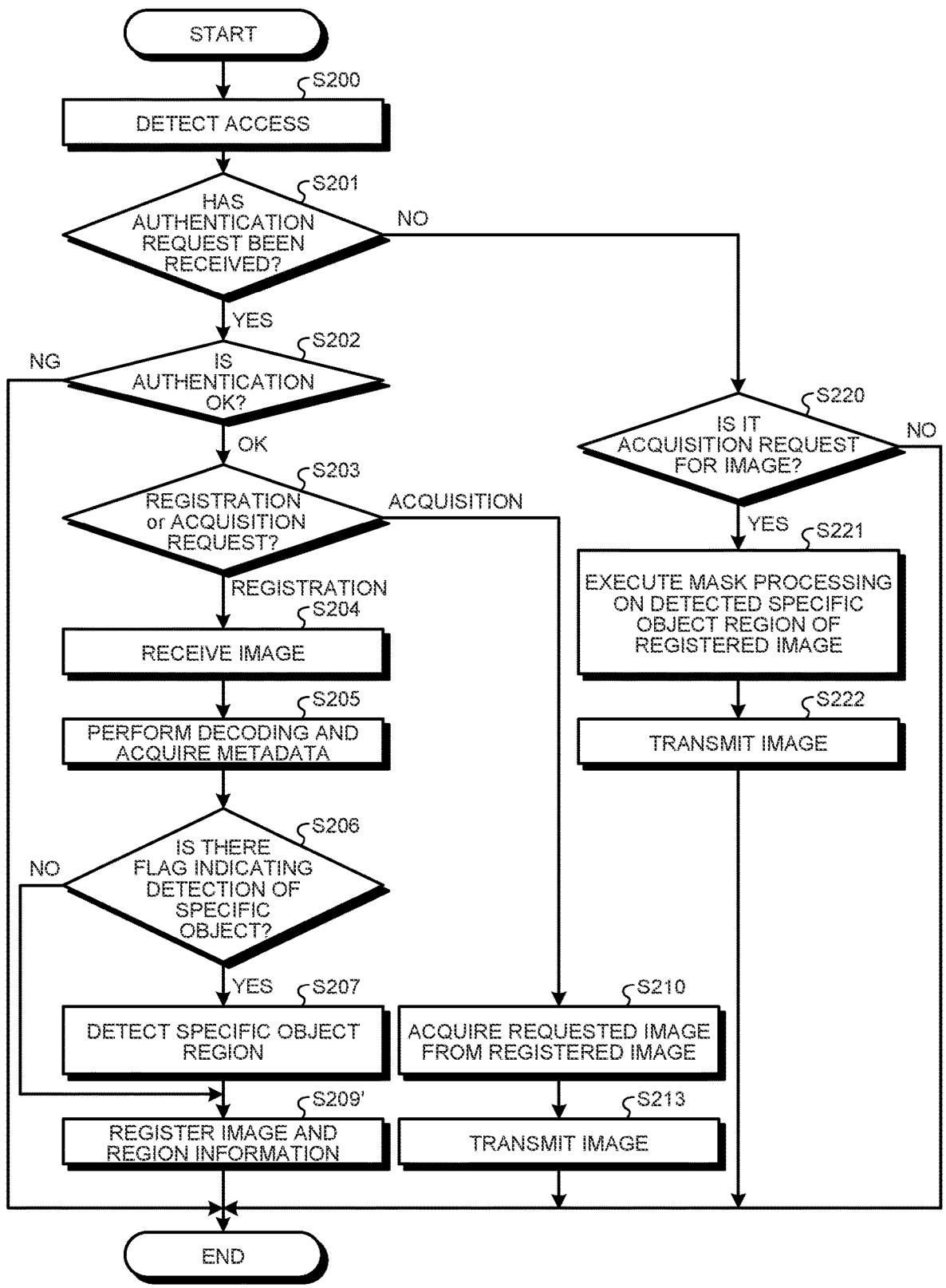
FIG. 18 is a flowchart illustrating one example of processing in a server according to a second embodiment.

FIG. 18 is a flowchart illustrating one example of processing in the server 10 according to the second embodiment. Note that, in FIG. 18, the processing common to that in the flowchart of FIG. 13 described above is illustrated by attaching the same sign. Furthermore, the processing described in FIG. 10 can be applied as it is to the processing of the terminal apparatus 30 in the case where a captured image is registered in an SNS provided by the server 10.

In FIG. 18, in Step S200, the server 10 detects access via the network 2 with the communication unit 100. In the next Step S201, the server 10 determines whether or not the access that has been detected in Step S200 comes from an access source that has received an authentication request with the authentication unit 101.

When determining that the access that has been detected in Step S200 has received the authentication request with the authentication unit 101 (Step S201, "Yes"), the server 10 shifts the processing to Step S202. In Step S202, the authentication unit 101 determines whether or not the authentication for the received authentication request is successful. When determining that the authentication for the received authentication request is not successful (Step S202, "NG"), the authentication unit 101 ends the series of pieces of processing according to the flowchart of FIG. 18.

In contrast, when determining that the authentication for the received authentication request is successful with the authentication unit 101 (Step S202, "OK"), the server 10 shifts the processing to Step S203. In Step S203, the server 10 determines which of registration and acquisition of an image the access that has been detected in Step S200 requests with, for example, the communication unit 100. When determining that the access that has been detected in Step S200 requests image registration (Step S203, "registration"), the communication unit 100 shifts the processing to Step S204. In contrast, when determining that the access that has been detected in Step S200 requests acquisition of an image (Step S203, "acquisition"), the communication unit 100 shifts the processing to Step S210.

In Step S204, the server 10 receives a file, in which the image is stored, with the communication unit 100. The file has been transmitted from the access source whose access has been detected in Step S200. The access source is, for example, the terminal apparatus 30. The communication unit 100 receives the file in which the captured image is stored. The captured image has been transmitted in Step S106 in the flowchart of FIG. 10.

In the next Step S205, the server 10 takes out the compressed and encoded captured image from the file that has been received in Step S204, and decodes the captured image with the decoding unit 102 to decode the captured image. The decoding unit 102 also holds a compressed and encoded captured image stored in a received file. Furthermore, the decoding unit 102 acquires metadata from the file.

In the next Step S206, the server 10 determines whether or not the metadata that has been acquired in Step S205 contains a detection flag indicating that a specific object has been detected with the decoding unit 102. When determining that the detection flag is not contained (Step S206, "No"), the decoding unit 102 shifts the processing to Step S209'. In contrast, when determining that the detection flag is contained (Step S206, "Yes"), the decoding unit 102 shifts the processing to Step S207.

In Step S207, the server 10 analyzes the captured image that has been decoded in Step S205 with the analysis unit 103, and detects a specific object region from the captured image. The analysis unit 103 holds the coordinates of the detected specific object region in association with the captured image. When the detection of the specific object region is performed in Step S207, the processing is shifted to Step S209'. In the second embodiment, the mask processing on the detected specific object region in Step S208 in FIG. 13 is not executed at the time of registering the captured image.

In the next Step S209', the server 10 stores the captured image (image file) that has been received in Step S204 and the coordinates of the specific object region associated with the captured image in Step S207 in the storage 1003 with the storage unit 105. When the captured image is registered in the SNS, the series of pieces of processing according to the flowchart of FIG. 18 is ended.

When the access detected in Step S200 is determined to request acquisition of an image in the above-described Step S203 (Step S203, "acquisition"), the processing is shifted to Step S210. In Step S210, the server 10 acquires a file in which a captured image requested to be acquired is stored from a registered image, which is stored in, for example, the storage 1003 and has been registered in the SNS, with the storage unit 105.

When the registered image is acquired in Step S210, the processing is shifted to Step S213. That is, in the second embodiment, since mask processing is not performed on the registered image, determination processing by using the detection flag of Step S211 in FIG. 13 and the mask canceling processing in Step S212 are omitted. In Step S213, the server 10 transmits the captured image that has been acquired in Step S210 to the access source whose access has been detected in Step S200 with the communication unit 100. When the captured image is transmitted, the series of pieces of processing according to the flowchart of FIG. 18 is ended.

When determining that the access that has been detected in Step S200 has not received the authentication request with the authentication unit 101 in the above-described Step S201 (Step S201, "No"), the server 10 shifts the processing to Step S220. In Step S220, the server 10 determines whether the access that has been detected in Step S200 requests acquisition of an image with the communication unit 100. When determining that the access does not request acquisition of an image (Step S220, "No"), the communication unit 100 ends the series of pieces of processing according to the flowchart of FIG. 18.

In contrast, when determining that the access requests acquisition of an image with the communication unit 100 (Step S220, "Yes"), the server 10 shifts the processing to Step S221. In Step S221, the server 10 acquires the captured image requested by the access source of the access that has been detected in Step S200 among the captured images that have been registered in Step S209' with the mask processing unit 104. As for the acquired captured image, the server 10 performs mask processing on a region corresponding to a specific object of the captured image based on the coordinates of the specific object associated with the captured image. In the next Step S222, the server 10 transmits the captured image on which the mask processing has been performed to the access source whose access has been detected in Step S200 with the communication unit 100.

When the captured image on which the mask processing has been performed in Step S222 is transmitted, the series of pieces of processing according to the flowchart of FIG. 18 is ended.

In the second embodiment, irreversible mask processing is preferably performed on the captured image in Step S221. Examples of the irreversible mask processing include processing of replacing a region corresponding to a specific object region of the captured image with another image such as a solid image having a uniform color in the region and a predetermined icon image. Not limited to this, the entire captured image may be replaced with, for example, a solid image. The same applies when the captured image is a moving image.

As described above, a captured image acquired by unauthorized access to an SNS is covered with a mask by performing irreversible mask processing on a region corresponding to a specific object region of the captured image, so that an image contained in the specific object region cannot be identified. Consequently, scattering of personal information contained in the specific object region can be inhibited. Furthermore, the image contained in the specific object region is made unidentifiable on the reception side of the captured image by performing irreversible mask processing on a region of the captured image corresponding to the specific object region. Thus, scattering of personal information contained in a specific object region can be inhibited more effectively.

Note that, in the second embodiment, the mask processing is not performed on a registered captured image itself. When a registered captured image is accessed by, for example, some method without logging in to the SNS, an original captured image may thus be acquired. Thus, measures against unauthorized access are preferably taken separately.

Figure 19:
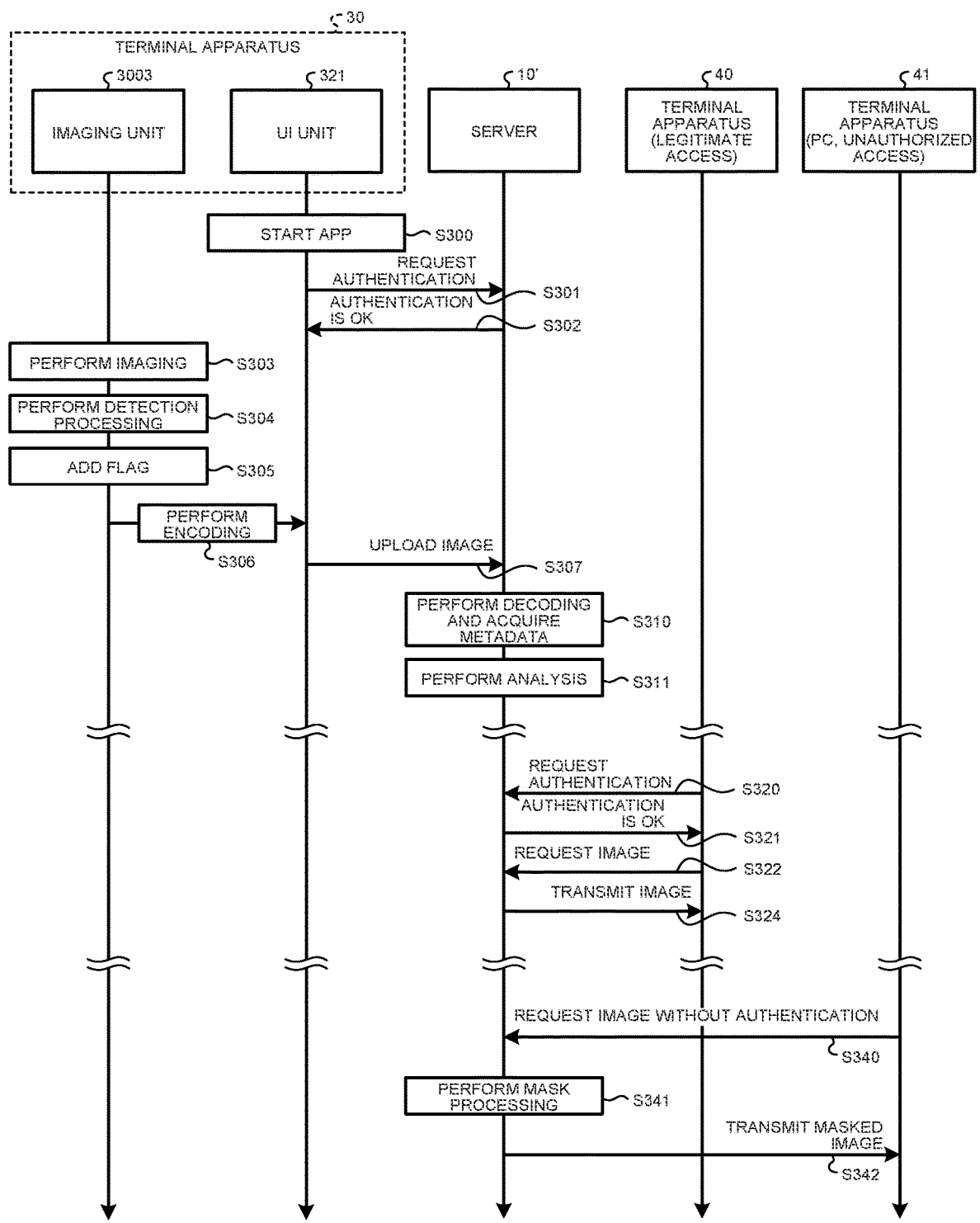
FIG. 19 is a sequence chart illustrating one example of the overall operation of the information processing system according to the second embodiment.

FIG. 19 is a sequence chart illustrating one example of the overall operation of the information processing system 1 according to the second embodiment. Note that, in the following description, the terminal apparatus 30 transmits a captured image, which is a still image, captured by the imaging unit 3003 to the server 10. Furthermore, in FIG. 19, the processing of Steps S300 to S310 among pieces of processing of acquiring a captured image in the terminal apparatus 30 and registering the captured image in the server 10 is the same as that described with reference to FIG. 17, so that the description will be omitted here. Furthermore, in the processing in FIG. 19, the mask processing of Step S312 in FIG. 17 is omitted.

In FIG. 19, Steps S320 to S324 illustrate an example of processing in the case of, for example, the terminal apparatus 40 accessing the server 10 by legitimate access, logging in to the SNS, and acquiring a captured image registered in the SNS. In the case of the second embodiment, the mask processing is not performed on a registered captured image. Thus, in the processing in FIG. 19, the mask canceling processing of Step S323 in FIG. 17 is omitted. In FIG. 19, the processing of Steps S320 to S322 is the same as that of Steps S320 to S322 in FIG. 17, so that the description will be omitted here.

In FIG. 19, in Step S324', the server 10 transmits a captured image requested by the terminal apparatus 40 with the communication unit 100 (Step S324). The terminal apparatus 40 decodes the captured image, decodes the compressed code, and displays the captured image on a display. Since the mask processing is not performed on the captured image, the captured image can be viewed on the terminal apparatus 40 with the specific object being identifiable.

In FIG. 19, Steps S340 to S342 illustrate an example of processing in the case of accessing the server 10 by unauthorized access and acquiring a captured image registered in the SNS without logging in to the SNS. For example, it is assumed that a captured image registered in the SNS has been requested by performing access without authentication of the server 10 without transmitting account information and requesting authentication from the terminal apparatus 41 to the server 10 (Step S340).

The server 10 performs irreversible mask processing on the requested captured image with the mask processing unit 104 in response to the request from the terminal apparatus 41 in Step S340 (Step S341). Consequently, the terminal apparatus 41 acquires a captured image that has been subject to the irreversible mask processing and is covered with a mask (Step S342). Since the specific object is irreversibly covered with a mask in the captured image, the specific object cannot be identified in the captured image viewed on the terminal apparatus 41. Thus, even if the captured image is leaked from the terminal apparatus 41 to, for example, the Internet, scattering of personal information contained in the specific object is prevented.

As described above, in the second embodiment, whether treatment (mask processing) on a requested image is performed or not can be controlled in accordance with which of legitimate or unauthorized the access to the server 10 is, and a treated state and an untreated state for an image are compatible. Furthermore, since an image is irreversibly treated against an unauthorized access, scattering of, for example, personal information contained in an image before treatment can be inhibited.

Note that, as in the second embodiment, the processing of detecting all specific objects that can be detected from a captured image in the terminal apparatus 30 can be applied as a variation. The processing has been described in the above-described variation of the first embodiment.

Third Embodiment

Next, a third embodiment will be described. Although, in the above description, an example in which the first and second embodiments are applied to a single service provided by the server 10 has been described, this example is not a limitation. That is, the disclosure is also applicable to a plurality of services that work together.

Figure 20:
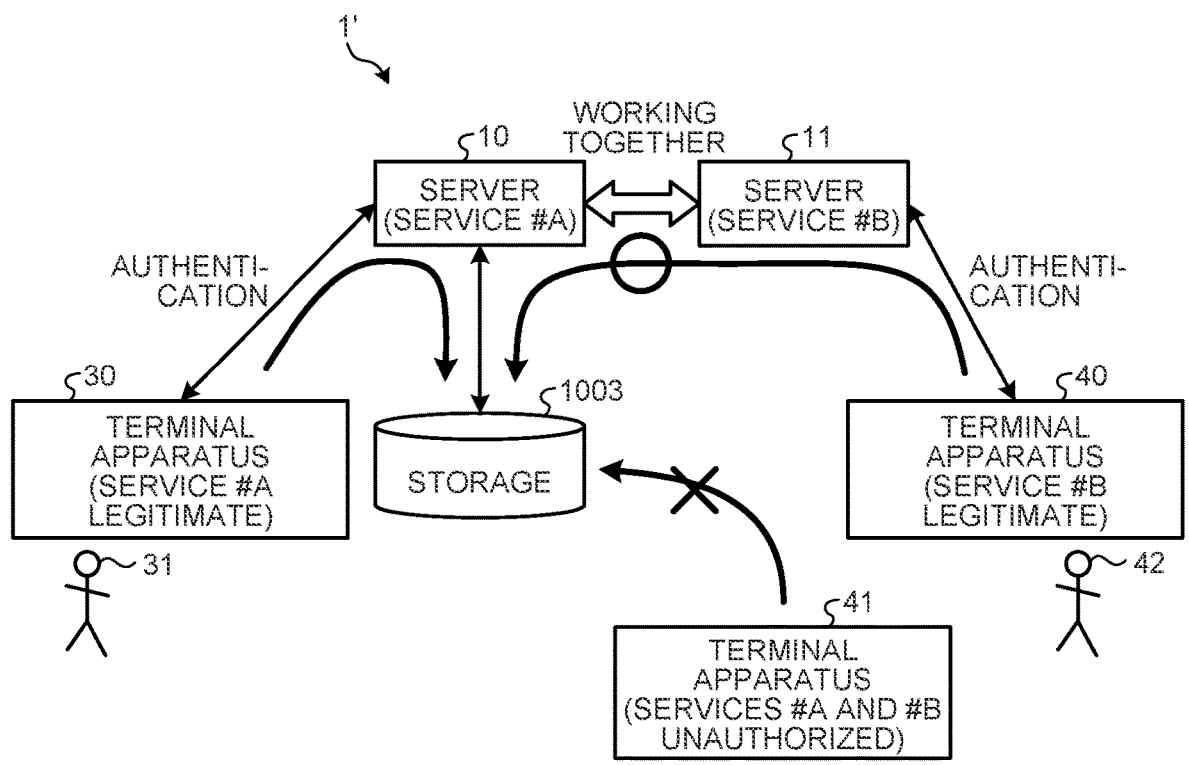
FIG. 20 illustrates an example of the configuration of an information processing system according to a third embodiment.

FIG. 20 schematically illustrates an example of the configuration of an information processing system according to third embodiment. In FIG. 20, an information processing system 1' according to the third embodiment includes the server 10 and a server 11. The server 10 provides the SNS (referred to as a service #A) described in the first or second embodiment. In the following, the server 10 provides the SNS described in the first embodiment as the service #A. The server 11 provides a service #B. The service #B is used by performing authentication processing, and may be an SNS or another service. Here, the service #B is an SNS different from the service #A.

The service #A and the service #B work together. For example, a user, who logs in to the server 11 and is permitted to use the service #B, can use the service #A provided by the server 10 without explicit login processing to the server 10.

In one example, the user 31 accesses the server 10 from the terminal apparatus 30, and logs in to the service #A. The user 31 registers a captured image captured by the terminal apparatus 30 in the service #A. The terminal apparatus 30 registers the captured image in the storage 1003 of the server 10 by, for example, the processing of Steps S300 to S312 in FIG. 17. At this time, the server 10 performs mask processing on a specific object region contained in a captured image, stores the captured image in the storage 1003, and registers the captured image to the Service #A.

Here, an SNS app (B) for using the service #B is mounted in the terminal apparatus 40. The functional configuration of the terminal apparatus 40 is equivalent to the configuration described with reference to FIG. 8. The function of the SNS app (B) is also equivalent to the function of the application unit 302 in FIG. 8. A user 42 starts the SNS app (B) on the terminal apparatus 40, transmits account information of the service #B to the server 11, and requests authentication. When the authentication performed by the server 11 is successful, the terminal apparatus 40 logs in to the service #B. This makes the function of the service #B usable from the terminal apparatus 40.

Here, the service #B works together with the service #A. The services working together enables the terminal apparatus 40 to use the function of the service #A by logging in to the service #B. In this case, the terminal apparatus 40 can acquire a captured image stored in the storage 1003 and registered in the service #A via the service #B.

When receiving an acquisition request for a captured image registered in the service #A via the service #B (server 11), the server 10 regards the terminal apparatus 40 as having transmitted the acquisition request for the captured image through, for example, the authentication processing in Steps S320 and S321 in FIG. 17. Thus, the server 10 cancels the mask applied on a specific object region of the captured image, and transmits the captured image whose mask has been canceled to the terminal apparatus 40 via the service #B (server 11) in accordance with the processing of Step S322 in FIG. 17. This enables viewing of the captured image with the specific object being identifiable at the terminal apparatus 40.

Next, a case where a captured image registered in the service #A is acquired from, for example, the terminal apparatus 41 without logging in to any of the service #A and the service #B will be described. In this case, as illustrated in Steps S330 to S332 in FIG. 17, the server 10 does not cancel a mask applied on a captured image for a request from an unauthenticated access source. Consequently, the terminal apparatus 41 acquires a captured image covered with a mask, and a specific object cannot be identified in the captured image viewed on the terminal apparatus 41. Thus, even if the captured image is leaked from the terminal apparatus 41 to, for example, the Internet, scattering of personal information contained in the specific object is prevented.

In this way, the disclosure is also applicable to a plurality of services that work together.

Note that the effects set forth in the specification are merely examples and not limitations. Other effects may be exhibited.

Note that the present technology may also have the configurations as described below.

(1) An Information Processing System Comprising:

a terminal apparatus; and an information processing apparatus, the terminal apparatus including:
a solid-state imaging element; and
a first communication unit, the solid-state imaging element including:
an image sensor that converts received light into an image;
an image processing unit that detects a specific object in the image; and
an output interface that outputs the image, the first communication unit transmitting an image output from the output interface, the information processing apparatus including
a second communication unit; and
a processor, wherein the processor:

receives an image transmitted from the terminal apparatus with the second communication unit; and when the image received with the second communication unit is the image in which the image processing unit has detected the specific object, performs mask processing of masking the specific object.

(2) The Information Processing System According to (1),
wherein the processor:
stores the image in which the specific object is masked in a storing unit;
when receiving an access request for the image stored in the storing unit, determines whether or not a transmission source of the access request is permitted to access the image; and
when determining that access to the image is permitted, cancels the mask.
(3) The Information Processing System According to (1) or (2),
in which the processor reversibly masks the specific object by the mask processing.
(4) The Information Processing System According to any One of (1) to (3),
wherein the processor masks the specific object by encrypting a predetermined region including the specific object of an image in which the specific object has been detected.
(5) The Information Processing System According to (1), Wherein the Processor:
stores the received image in a storing unit;
when receiving an access request for the image stored in the storing unit, determines whether or not a transmission source of the access request is permitted to access the image; and
when determining that access to the image is not permitted, performs mask processing of masking the specific object of the image.
(6) The Information Processing System According to (5),
in which the processor irreversibly masks the specific object by the mask processing.
(7) The Information Processing System According to any One of (1) to (6),
wherein, when the specific object is detected from an image output from the image sensor, the image processing unit adds detection information indicating that the specific object has been detected to the image;
the first communication unit transmits the image to which the detection information has been added; and
when the detection information is added to the image received by the second communication unit, the processor masks the specific object included in the image.
(8) The Information Processing System According to (7),
wherein, when the detection information is added to an image received by the second communication unit, the processor acquires position information indicating a position of the specific object in the image, and masks the specific object based on the position information.
(9) The Information Processing System According to (7),
wherein the image processing unit detects the specific object from an image output from the image sensor, and acquires position information indicating a position of the detected specific object on the image,
the first communication unit adds the position information to an image output from the output interface as the detection information, and transmits the image, and
the processor masks the specific object included in the image based on the position information added to an image communicated by the second communication unit.
(10) The Information Processing System According to any One of (1) to (9),
wherein the information processing apparatus includes a plurality of information processing apparatuses that operate in cooperation with each other.

(11) An Information Processing Method Comprising:
a conversion step of an image sensor converting received light into an image, the image sensor being included in a fixed imaging element equipped in a terminal apparatus;
a detection step of an image processing unit included in the fixed imaging element detecting a specific object in the image;
an output step of an output interface included in the fixed imaging element outputting the image;
a transmission step of a first communication unit equipped in the terminal apparatus transmitting an image output in the output step;
a reception step of a processor equipped in an information processing apparatus receiving an image transmitted from the terminal apparatus with a second communication unit; and
a processing step of the processor masking the specific object when an image received in the reception step is an image in which the specific object has been detected in the detection step.
(12) A Terminal Apparatus Comprising:
a solid-state imaging element; and a communication unit, the solid-state imaging element including:
an image sensor that converts received light into an image;
an image processing unit that detects a specific object from the image; and
an output interface that outputs the image, the communication unit transmitting an image output from the output interface,
wherein, when the specific object has been detected from the image, the image processing unit adds detection information indicating that the specific object has been detected to the image, and
the communication unit transmits the image to which the detection information has been added.
(13) The Terminal Apparatus According to (12),
wherein the image processing unit detects the specific object from an image output from the image sensor, and acquires position information indicating a position of the detected specific object on the image, and
the communication unit adds the position information to an image output from the output interface as the detection information, and transmits the image.
(14) An Information Processing Apparatus Comprising:
a processor; and
a communication unit that communicates with a terminal apparatus, the terminal apparatus detecting a specific object in an image obtained by an image sensor converting received light, and transmitting the image,
wherein the processor:
receives the image transmitted from the terminal apparatus with the communication unit; and
when the image received with the communication unit is the image in which the terminal apparatus has detected the specific object, performs mask processing of masking the specific object.
(15) The Information Processing Apparatus According to (14),
wherein the processor:
stores the image in which the specific object is masked in a storing unit;
when receiving an access request for the image stored in the storing unit, determines whether or not a transmission source of the access request is permitted to access the image; and when determining that access to the image is permitted, cancels the mask.

(16) The Information Processing Apparatus According to (14) or (15),
  in which the processor reversibly masks the specific object by the mask processing.

(17) The Information Processing Apparatus According to any One of (14) to (16),
  wherein the processor masks the specific object by encrypting a predetermined region including the specific object of an image in which the specific object has been detected.

(18) The Information Processing Apparatus According to (14),
  wherein the processor:
  stores the received image in a storing unit;
  when receiving an access request for the image stored in the storing unit, determines whether or not a transmission source of the access request is permitted to access the image; and
  when determining that access to the image is not permitted, masks the specific object of the image.

(19) The Information Processing Apparatus According to (18),
  in which the processor irreversibly masks the specific object by the mask processing.

(20) The Information Processing Apparatus According to any One of (14) to (19),
  wherein, when detection information indicating that the specific object has been detected is added to an image received by the communication unit, the processor masks the specific object included in the image.

(21) The Information Processing Apparatus According to (20),
  wherein, when the detection information is added to the image received by the communication unit, the processor acquires position information indicating a position of the specific object in the image, and masks the specific object based on the position information.

(22) The Information Processing Apparatus According to (20),
  wherein the processor masks the specific object included in the image based on position information indicating a position on an image of the specific object, the position information being added to the image communicated by the communication unit as the detection information.

REFERENCE SIGNS LIST

1 INFORMATION PROCESSING SYSTEM
2 NETWORK
10, 11 SERVER
30, 40, 41 TERMINAL APPARATUS
50a, 50a', 50b, 50b' CAPTURED IMAGE
51a, 51b, 52a, 52b RECTANGULAR REGION
100 COMMUNICATION UNIT
101 AUTHENTICATION UNIT
102 DECODING UNIT
103 ANALYSIS UNIT
104 MASK PROCESSING UNIT
105 STORAGE UNIT
300 IMAGING PROCESSING UNIT
301 OBJECT DETECTION UNIT
302 APPLICATION UNIT
303 COMMUNICATION UNIT
320 ENCODING UNIT
322 AUTHENTICATION REQUESTING UNIT
3003 IMAGING UNIT
3100 PIXEL UNIT
3101 SIGNAL PROCESSING UNIT
3102 MEMORY UNIT
3103 I/F UNIT
3104 IMAGE PROCESSING UNIT
3105 ELEMENT CONTROL UNIT

What is claimed is:

1. An information processing system comprising:
a terminal apparatus; and
an information processing apparatus,
wherein the terminal apparatus includes:
  a solid-state imaging element;
  a first memory; and
  a first communication interface,
  wherein the solid-state imaging element includes:
    an image sensor that converts received light into an image;
    an image processing circuitry that detects a specific object in the image; and
    an output interface that outputs the image,
  wherein the first communication interface transmits the image output from the output interface to a social network service that a user of the terminal apparatus is logged into, and
wherein the information processing apparatus includes:
  a second communication interface;
  a second memory; and
  a processor,
    wherein the processor receives the image transmitted from the terminal apparatus with the second communication interface, and
    wherein, when the image received with the second communication interface is the image in which the image processing circuitry has detected the specific object, the processor performs mask processing to mask the specific object,
  wherein the second memory stores the image in which the specific object is masked,
  wherein in response to receiving an access request for the image stored in the second memory the processor determines whether the access request is legitimate,
  wherein the access request comprises enlarging the image in a display of the terminal apparatus,
  wherein the access request is legitimate if the access request is from a user logged into the social network service, and
  wherein in response to determining that the access request is legitimate, the processor cancels masking of the specific object.

2. The information processing system according to claim 1, wherein the processor masks the specific object by encrypting a predetermined region including the specific object of an image in which the specific object has been detected.

3. The information processing system according to claim 1, wherein the processor,
  in response to determining that the access request is not legitimate, performs mask processing to mask the specific object of the image.

4. The information processing system according to claim 1, wherein:
  when the specific object is detected from the image output from the image sensor, the image processing circuitry adds detection information indicating that the specific object has been detected to the image;

the first communication interface transmits the image to which the detection information has been added; and when the detection information is added to the image received by the second communication interface, the processor masks the specific object included in the image.

5. The information processing system according to claim 4, wherein, when the detection information is added to the image received by the second communication interface, the processor acquires position information indicating a position of the specific object in the image, and masks the specific object based on the position information.

6. The information processing system according to claim 4, wherein:
the image processing circuitry detects the specific object from the image output from the image sensor, and acquires position information indicating a position of the detected specific object on the image;
the first communication interface adds the position information to the image output from the output interface as the detection information, and transmits the image; and
the processor masks the specific object included in the image based on the position information added to the image.

7. The information processing system according to claim 1, wherein the information processing apparatus includes a plurality of information processing apparatuses that operate in cooperation with each other.

8. An information processing method comprising:
a conversion step of an image sensor converting received light into an image, the image sensor being included in a fixed imaging element equipped in a terminal apparatus;
a detection step of an image processing circuitry included in the fixed imaging element detecting a specific object in the image;
an output step of an output interface included in the fixed imaging element outputting the image;
a transmission step of a first communication interface equipped in the terminal apparatus transmitting the image output in the output step;
a reception step of a processor equipped in an information processing apparatus receiving the image transmitted from the terminal apparatus with a second communication interface;
a processing step of the processor masking the specific object when the image received in the reception step is the image in which the specific object has been detected in the detection step;
a storing step of a memory storing the image in which the specific object is masked;
a second reception step of the processor in the information processing apparatus receiving an access request for the image stored in the memory, wherein the access request comprises enlarging the image in a display of the terminal apparatus; and
a determination step of the processor in the information processing apparatus determining whether the access request is legitimate,
wherein the access request is legitimate if the access request is from a user logged into a social network service, and
wherein in response to determining that the access request is legitimate, a second processing step of canceling the masking of the specific object.

9. A terminal apparatus comprising:
a solid-state imaging element; and
a communication interface, the solid-state imaging element including:
an image sensor that converts received light into an image;
an image processing circuitry that detects a specific object from the image; and
an output interface that outputs the image,
wherein the communication interface transmits the image output from the output interface,
wherein, when the specific object has been detected from the image, the image processing circuitry adds detection information indicating that the specific object has been detected to the image, and
wherein the communication interface transmits the image to which the detection information has been added.

10. The terminal apparatus according to claim 9, wherein:
the image processing circuitry detects the specific object from an image output from the image sensor, and acquires position information indicating a position of the detected specific object on the image, and
the communication interface adds the position information to the image output from the output interface as the detection information, and transmits the image.

11. An information processing apparatus comprising:
a processor;
memory; and
a communication interface that communicates with a terminal apparatus, the terminal apparatus transmitting an image obtained by an image sensor,
wherein the processor:
receives the image transmitted from the terminal apparatus with the communication interface;
determines that a specific object is detected in the image received from the terminal apparatus;
performs mask processing to mask the specific object;
wherein the memory stores the image in which the specific object is masked; and
receives an access request for the image stored in the memory, wherein the access request comprises enlarging the image in a display of the terminal apparatus; and
determines whether the access request is legitimate,
wherein the access request is legitimate if the access request is from a user logged into a social network service, and
wherein in response to determining that the access request is legitimate, canceling masking of the specific object.

12. The information processing apparatus according to claim 11, wherein the processor masks the specific object by encrypting a predetermined region including the specific object of the image in which the specific object has been detected.

13. The information processing apparatus according to claim 11, wherein the processor, in response to determining that the access request is not legitimate, maintains masking on the specific object of the image.

14. The information processing apparatus according to claim 11, wherein, when detection information indicating that the specific object has been detected is added to the image received by the communication interface, the processor masks the specific object included in the image.

15. The information processing apparatus according to claim 14, wherein, when the detection information is added to the image received by the communication interface, the processor acquires position information indicating a position of the specific object in the image, and masks the specific object based on the position information.

16. The information processing apparatus according to claim 14, wherein the processor masks the specific object included in the image based on position information indicating a position on an image of the specific object, the position information being added to the image communicated by the communication interface as the detection information.

* * * * *